US010305831B2

(12) United States Patent
Parikh et al.

(10) Patent No.: US 10,305,831 B2
(45) Date of Patent: *May 28, 2019

(54) COMPLIANCE MECHANISM FOR MESSAGING

(71) Applicant: FairWords, Inc., Boulder, CO (US)

(72) Inventors: Anish Parikh, Longmont, CO (US); Evan M. Caron, Houston, TX (US); Vadim Polosatov, Ulyanovsk (RU)

(73) Assignee: FairWords, Inc., Boulder, CO (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/572,714

(22) Filed: Dec. 16, 2014

(65) Prior Publication Data

US 2015/0172243 A1 Jun. 18, 2015

Related U.S. Application Data

(60) Provisional application No. 61/916,563, filed on Dec. 16, 2013.

(51) Int. Cl.
*H04L 12/58* (2006.01)

(52) U.S. Cl.
CPC .............. *H04L 51/12* (2013.01); *H04L 51/04* (2013.01)

(58) Field of Classification Search
CPC ................................ H04L 51/12; H04L 51/04
See application file for complete search history.

(56) References Cited

U.S. PATENT DOCUMENTS

| 7,827,165 | B2 |  | 11/2010 | Abernethy, Jr. et al. |  |
|---|---|---|---|---|---|
| 7,933,960 | B2 |  | 4/2011 | Chen et al. |  |
| 9,235,629 | B1 | * | 1/2016 | Jones | G06Q 10/10 |
| 2004/0193557 | A1 |  | 9/2004 | Olsen |  |
| 2004/0215449 | A1 | * | 10/2004 | Roy | G10L 15/08 704/211 |
| 2007/0282814 | A1 | * | 12/2007 | Gupta | G06F 17/27 |
| 2008/0091408 | A1 | * | 4/2008 | Roulland | G06F 17/271 704/9 |
| 2008/0208567 | A1 | * | 8/2008 | Brockett | G06F 17/273 704/9 |
| 2009/0006950 | A1 | * | 1/2009 | Gross | G06F 17/274 715/259 |
| 2010/0125897 | A1 | * | 5/2010 | Jain | H04L 63/0272 726/7 |
| 2010/0169769 | A1 |  | 7/2010 | Jimenez et al. |  |
| 2010/0318318 | A1 |  | 12/2010 | Spiesberger |  |
| 2010/0318903 | A1 | * | 12/2010 | Ferren | G06F 17/2735 715/259 |

(Continued)

OTHER PUBLICATIONS

Harrell, Robert B., "United States Office Action Re U.S. Appl. No. 15/005,132", dated Sep. 27, 2017, pp. 19 Published in: US.

(Continued)

*Primary Examiner* — Abdullahi E Salad
(74) *Attorney, Agent, or Firm* — Neugeboren O'Dowd PC

(57) ABSTRACT

This disclosure describes systems, methods, and apparatus for precluding transmission of messages that breach one or more compliance or legal framework. In particular, messages, whether digital, written, or verbal, can be stopped from leaving a device on which they are created, thereby preventing non-compliant messages from reaching intermediary servers that could constitute a compliance violation even if the message never reached a recipient.

13 Claims, 17 Drawing Sheets

(56) References Cited

U.S. PATENT DOCUMENTS

| | | | | |
|---|---|---|---|---|
| 2011/0238979 A1* | 9/2011 | Harp | ............... | H04L 63/0227 713/153 |
| 2012/0078612 A1* | 3/2012 | Kandekar | ........... | G06F 17/2745 704/9 |
| 2012/0079372 A1* | 3/2012 | Kandekar | ........... | G06F 17/2745 715/256 |
| 2012/0179682 A1* | 7/2012 | De Saeger | ........ | G06F 17/30401 707/737 |
| 2012/0191792 A1* | 7/2012 | Chebiyyam | .......... | G06Q 10/107 709/206 |
| 2012/0209751 A1* | 8/2012 | Chen | ................... | G06Q 30/06 705/27.2 |
| 2012/0297317 A1* | 11/2012 | Radom | ............... | G06F 3/0237 715/752 |
| 2013/0238318 A1* | 9/2013 | Enoki | ................. | G06F 17/277 704/9 |
| 2013/0253910 A1 | 9/2013 | Turner et al. | | |
| 2013/0339457 A1* | 12/2013 | Freire | ................ | G06Q 50/01 709/206 |
| 2014/0143268 A1* | 5/2014 | Finkelstein | ......... | G06F 17/3064 707/767 |
| 2014/0278361 A1* | 9/2014 | Pak | ..................... | G06F 17/273 704/9 |
| 2015/0033283 A1* | 1/2015 | Mulder | .................. | H04L 63/20 726/1 |
| 2015/0154184 A1* | 6/2015 | Bahgat | ................. | G06F 17/271 704/2 |
| 2016/0006680 A1* | 1/2016 | Chebiyyam | ......... | G06Q 10/107 709/206 |
| 2016/0063874 A1 | 3/2016 | Czerwinshi et al. | | |

OTHER PUBLICATIONS

Gruber, Stephen S., "Response to Office Action Re U.S. Appl. No. 15/005,132", dated Feb. 27, 2018, pp. 13 Published in: US.

* cited by examiner

Primary Contacts
External Contacts
  Moe
  Curley
  Larry
Internal Contacts
  Athos
  Porthos
  Aramis User: 20 handle in effect
User: 1430
Porthos: 1425
User: nice 2pts
Moe: 1421
Porthos: GS BO
Moe: 1384 tics on the 1178s
User: the text that I am typing could bring down the company... it's probably a bad idea to put these words in writing... there's a very good chance that these words violate all sorts of compliance policies

FIG. 15

COMPLIANCE MECHANISM FOR MESSAGING

CROSS REFERENCE TO RELATED APPLICATIONS

The present Application for Patent claims priority to Provisional Application No. 61/916,563 entitled "COMPLIANCE MECHANISM FOR MESSAGING" filed Dec. 16, 2013, and assigned to the assignee hereof and hereby expressly incorporated by reference herein.

FIELD OF THE DISCLOSURE

The present disclosure relates generally to messaging systems. In particular, but not by way of limitation, the present disclosure relates to systems, methods and apparatuses for preventing the communication of messages that could breach compliance policies or laws.

BACKGROUND

Email, instant messages, and chat room messages, and phone calls at work can often serve to place liability on companies for communications of their employees, even when those communications are against company policy. For instance, transcripts of non-compliant personal conversations over company email led the board of Boeing to demand the CEO's resignation in 2005. He had led the company well, but as he had sent personal message containing language outside of company policy he was no longer able to serve as an example for the rest of the company. While companies typically employ compliance guidelines to prevent such messages from being sent, such compliance mechanisms typically are ineffective because they require employees to self-police themselves. Some software-based compliance mechanisms exist, but these tend to analyze communications after the fact rather than helping to prevent "bad" communication from being made. There is therefore a need for systems, methods, and apparatus that prevent non-compliant messages from being communicated to a recipient.

SUMMARY OF THE DISCLOSURE

Exemplary embodiments of the present disclosure that are shown in the drawings are summarized below. These and other embodiments are more fully described in the Detailed Description section. It is to be understood, however, that there is no intention to limit the disclosure to the forms described in this Summary of the Disclosure or in the Detailed Description. One skilled in the art can recognize that there are numerous modifications, equivalents and alternative constructions that fall within the spirit and scope of the disclosure as expressed in the claims.

To overcome the challenges in the art, this application describes systems, methods, and apparatus that monitor typed, written, or verbal message creation (e.g., while a user types an email or instant message, or makes a phone call) and analyzes the communication in real-time to determine if a breach of compliance policy or law is likely to result from dissemination or transmission of the message. The systems, methods, and apparatus then disable functionality of the messaging system (e.g., a message dissemination mechanism) if a non-compliant (or potentially non-compliant) message is identified. In other words, the disabling action takes place before the compliance violation occurs—before the message can be logged or communicated to a recipient (e.g., stored to a long term or nonvolatile memory or transmitted from a sending device). For instance, a send button or return carriage key (or ENTER key) can be disabled, the offending phrases or sentences can be highlighted for the user, the addition of new words to a digital message can be disabled, forwarding of a handwritten note can be stopped, transmission of a voice signal over a cellular network can be impeded, and/or functionality of other programs on a communication device can be disabled, to name a few non-limiting examples. Such disabling can be carried out for a set period of time, or can ensue until the user corrects or changes a communication or makes changes sufficient that the communication is no longer identified as noncompliant. Once the potential violation has been corrected, the system can enable some or all of the disabled functionality and the message can be disseminated.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

FIG. 15 illustrates an embodiment of a digital messaging platform with at least one digital messaging function disabled;

DETAILED DESCRIPTION

Figure 1:
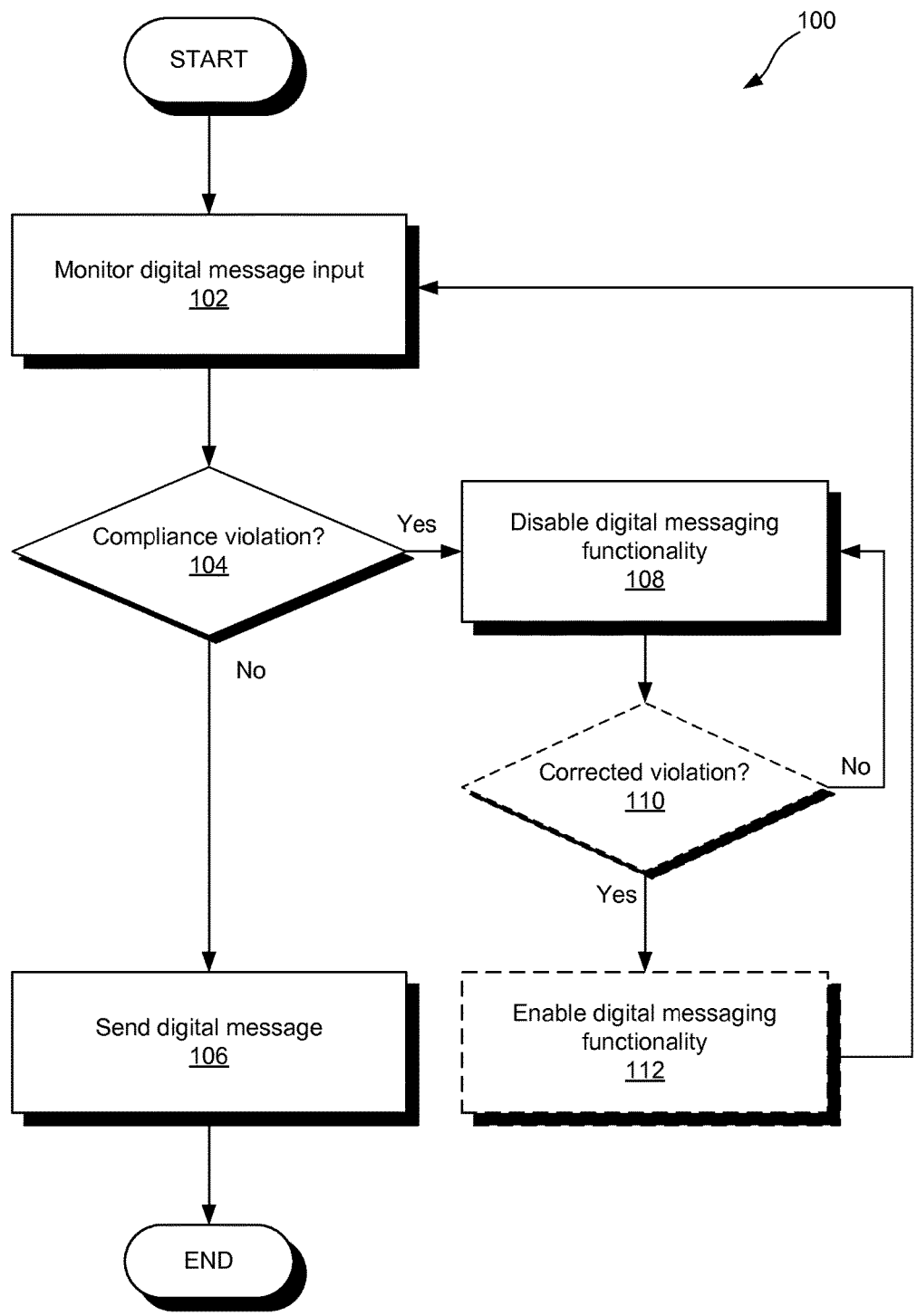
FIG. 1 illustrates a method for disabling functionality of a messaging system before a compliance violation, due to content of a communication, occurs.

The word "exemplary" is used herein to mean "serving as an example, instance, or illustration." Any embodiment described herein as "exemplary" is not necessarily to be construed as preferred or advantageous over other embodiments.

To overcome the challenges in the art, this application describes systems, methods, and apparatus that monitor typed, written, or verbal message creation (e.g., while a user types an email or instant message or makes a phone call) and analyzes the communication in real-time to determine if a breach of compliance policy or law is likely to result from dissemination of the message. Examples of communications envisioned in this application include, but are not limited to: digital messages (e.g., e-mail, text, fax), written messages (e.g., notes and hand-delivered memoranda), and verbal messages (e.g., telephone calls via handset or headset). The systems, methods, and apparatus then disable functionality of the messaging system if a non-compliant (or potentially non-compliant) message is identified. In the case of digital messages this can include disabling a send button in an e-mail, disabling send functionality that is triggered by depression of the "ENTER" key relative to an instant message, and disabling the ability to edit text in the digital message other than the flagged text, to name a few non-limiting examples. Digital messages may include attachments (e.g., attachments to an e-mail or attachments to a text message) that can also be analyzed for non-compliance. Again, where a non-compliant attachment is identified, transmission functionality or other functionality associated with the digital message can be disabled. In some cases, the attachment may even be automatically removed from the digital message and reattachment of the identical attachment may be precluded.

In the case of written messages a message auditing device can be used to analyze physical messages and provide a warning if the message is flagged as having non-compliant content. For instance, a device can take image samples of a written message as it is being written (or typed on a typewriter) or once the message has been completed. Image analysis software can convert the image into digital text via optical character recognition or other image analysis software. The digital text can then be analyzed to determine if non-compliant text or a non-compliant idea exists in the message. If non-compliant text or a non-compliant idea is flagged, then the user or sender can be notified of the potential offense, for instance via an audible or visual indicator. In one example, where a written or typed or printed message is to be transmitted via fax or similar technology, the fax machine or scanner can be disabled when non-compliant text or a non-compliant idea is flagged in a hardcopy of the message.

In the case of verbal messages a device can listen to the verbal message, analyze the words and content, determine if the verbal message includes non-compliant words or ideas, and provide a signal to the user of the non-compliance threat, or disable functionality of a device intended for transmission of the verbal message to a recipient. For instance, a cell phone handset or a Bluetooth headset for a mobile or landline telephone, to name two examples, could analyze verbal messages to be transmitted through these devices, delay the transmission long enough to enable the analysis to take place, and then disable transmission of the verbal message if a non-compliant message or idea is identified. In some cases, the listener may hear silence where the speaker said non-compliant words or the listener may hear a beep or other sound instead of the non-compliant words that the speaker intended the recipient to hear. The device may also notify the speaker that non-compliant words have been identified, and/or prevented from being heard by the listener. A headset may beep or vibrate to indicate to the speaker that a non-compliant message was detected and that said message was not conveyed to the listener. In embodiments where a hardcopy communication is scanned, faxed, or otherwise converted from a hardcopy to a digital form, the scanning device can include mechanisms to analyze the message and flag non-compliant text or ideas and then disable transmission or long term storage functionality. In the case of typed messages on a mechanical device such as a typewriter, keystrokes can be electronically monitored or visually monitored via a camera and analysis software.

In some embodiments, text or messages can be identified before completion of the drafting or verbal disclosure of a text or message. For instance, where a message is being typed or written, words can be identified before typing or writing of the word is complete. As one example where "bribe" is a word that can be flagged, and a user types or writes the letters, "brib", the systems and methods may flag this entry as a potential violation and disable messaging functionality before the user can even complete typing or writing the word. While it is possible that the user was attempting to enter a phrase like, "bribery is not good for the bottom line," which might not be in violation, this feature can be employed as an extra caution against certain words in addition to the typical functionality that flags complete words and messages. As another example, the partial message "fix the labor r" may be flagged, and messaging functionality disabled, before the user can complete the sentence.

In some cases, the portion of the word or message that has been drafted can be deleted, converted to blank spaces, or converted to symbols. For instance, the letters, "brib" may be converted to "XXXX" or "####." The partial sentence "fix the labor r" can be converted to "fix the _____". As seen, portions or an entire message can be converted to symbols or blanks or can be deleted.

Similarly, and in the case of verbal dictation of messages, flagged words may not be rendered on a screen or may be rendered using blanks or symbols as described above. In this way, while flagged words or messages may be spoken into a dictation device, the flagged words or messages are precluded from being added to the message in a computing device's short term memory and precluded from viewing on a display.

In all of the examples and embodiments of this disclosure, when a non-compliant message is flagged, a signal or message can be transmitted to a compliance officer. In other embodiments, reports can be generated and provided to a compliance officer indicating results of blocked, non-blocked, and flagged messages. In some instances, where communication via a digital device does not occur, and hence there is no automated mechanism for precluding the transmission of a non-compliant message, a message may be sent to a compliance officer so that the compliance officer can take action to prevent transmission or delivery of the message.

Where a digital device analyzes the text of a digital, written, or verbal communication, resources on the digital device (e.g., a headset) may not have the computing power to perform the analysis with sufficient speed. In these cases, the device can monitor the text or message and transmit a digital copy of the text or message, or an extracted version thereof, to a remote device for processing. For instance, a headset may convert a verbal message to a digital signal that is then transmitted via Bluetooth or other wireless technology to a cellular phone, nearby server, or other nearby computer, where the nearby computer converts the digital signal to digital text, analyzes the text, and returns a signal to the headset indicating that the verbal message is flagged or not-flagged (i.e., indicating to the device whether or not to disable messaging functionality). In other words, processing of communications and flagging of non-compliant messages can be offloaded to nearby private computing devices that then indicate to the original messaging device whether or not to disable messaging functionality.

While the disclosure covers all manner of communications, including, but not limited to, digital, hardcopy, and verbal, particular examples of digital messages are now described in order to better illustrate the general functionality described above and applicable to all manner of communications.

FIG. 1 illustrates a method for disabling functionality of a digital messaging system before a compliance violation, due to content of a digital message, occurs. The method 100 includes monitoring an input of text (e.g., from a keyboard or voice dictation) in a monitor digital message input operation 102. The method 100 repeatedly analyzes the digital message to determine if a compliance violation has occurred via compliance violation decision 104. If no violation is found, then digital messaging functionality continues unimpeded until either a violation is identified or the digital message is sent via send operation 106. If the violation decision 104 identifies a violation, then digital messaging functionality is disabled in a disable operation 108. The disabling operation 108 takes effect until the violation is fixed as determined by the violation corrected decision 110. During the disabling of digital messaging functionality, the method 100 continues to monitor content of the digital message and via this monitoring the violation corrected decision 110 can be made. Once the violation corrected decision 110 determines that the violation has been corrected, an enable digital messaging functionality operation 112 enables the functionality that had been disabled. The method 100 then loops back to the monitor digital message input operation 102 until the message is ready to be sent or until another potential compliance violation is identified by decision 104. When the message is ready to be sent and no potential compliance violations exist, the user can indicate an intent to send the message (e.g., by pressing a "send" button or by pressing an "ENTER" key on a keyboard, for instance).

The method 100 can be applied to systems and platforms for monitoring of any type of digital messaging including email, instant messaging (e.g., YAHOO! INC.'s messenger service, AOL INSTANT MESSAGING (AIM), GOOGLE's GOOGLE+ HANGOUTS, and PIVOT, to name a few), digital messaging sent from mobile telephones, and digital messages exchanged in chat rooms. The method 100 can be embodied as an add-on to SMS text messaging services or to text messaging or instant messaging platforms that are proprietary to a cellular carrier or to a device manufacturer. In order to disable functionality before a compliance violation has occurred (e.g., before the message is sent and therefore logged), monitoring can be performed on the user device where the message is being drafted. For instance, the method 100 can be performed by a computing device being used to draft a digital message. In some embodiments, the method 100 can be carried out via components and modules stored on the computing device and running on a processor of the computing device, while in other embodiments, portions of the method 100 can be stored on remote computing devices and processors of those remote computing devices (e.g., a web-based application).

The monitor operation 102 can include extracting words, phrases, and/or sentences from a draft digital message before it is sent. This can include extracting words, phrases, and/or sentences as each is created (e.g., typed or dictated). For instance, keystrokes can be monitored or recorded, and then parsed into words. The monitor operation 102 can also include extracting words, phrases, and/or sentences only when a block of text has been completely created. For instance, words may not be extracted until a sentence has been completely drafted. In another instance, extraction occurs after completion of an idea, where the end of an idea can be identified via one or more symbols, including, but not limited to, a period, a semicolon. Some symbols that may be excluded from those indicating an end of a message are a space, a slash, a dash, a comma, and any symbol within a word used to replace a letter of that word. The end of an idea may also be indicated by a user selecting other than a current window of the user interface. In another instance, phrases may only be extracted when a paragraph has been completed. In other examples, words, phrases, and/or sentences may not be extracted until an entire draft digital message is completed. In another example, extracting may be triggered by a pause in the drafting (e.g., a pause in typing or dictation). Extracted words, phrases, and/or sentences can be stored in a buffer or other temporary memory.

In an alternative embodiment, the words, phrases, and/or sentences can be extracted only when a user provides an input to send the draft message (e.g., pressing a "send" button or pressing an "ENTER" key on a keyboard to name two non-limiting examples). For instance, the method 100 may operate to check draft messages for compliance at the moment just before they are sent. If a violation is found, then the message is not sent and correction is required. Otherwise, the message is sent without the user experiencing anything more than a slight delay in the sending of the message—the method 100 operating during the slight delay.

Given one or more words, phrases, and/or sentences from the monitor operation 102, the compliance violation decision 104 analyzes the extracted text to determine if a compliance violation is likely to occur if the draft digital message is sent. Analysis can include comparing the extracted text to a compliance database of text to identify matches or similarities to text identified as likely to cause a compliance violation. Other methods of determining if a violation has occurred will be discussed in subsequent portions of this disclosure. The decision 104 may also attempt to determine a meaning or thrust of a phrase, sentence, or other text structure in extracted text, and compare the meaning, thrust, or spirit of the text to concepts in the compliance database. If a match or similarity is found, then the decision 104 directs the method 100 to disabling digital messaging functionality.

The compliance database can include text, phrases, sentences, pairs of words, combinations of words, tables or arrays of words and/or phrases, and/or concepts that have been flagged or identified as violating, or potentially violating, compliance policy or law. In some instances, the compliance database may include various sub databases, each corresponding to different compliance laws and/or policies. In other instances, there may be a separate compliance database for each different set of compliance laws and/or policies.

In some embodiments, the decision 104 can analyze extracted text to determine if an intent of the extracted text violates a spirit of the compliance policy or law. For instance, words in digital messages can be assigned scores and greater scores or additional scores can be assigned where two or more words share a dependency or where one or more of the words fits a part of speech (e.g., nouns, verbs, present verbs, past verbs, adjectives, etc.). For instance, the word "fix", or derivatives thereof, as an adjective (e.g., "the electrician fixed the network") may be assigned a lower score than the word "fix", or derivatives thereof, as a verb (e.g., "yesterday we fixed the index").

Since matches to the database may not be exact, a sensitivity level can be set and modified by a user or company compliance officer. The sensitivity level can dictate a level of similarity between the intent of the extracted text and the spirit of the compliance policy or law at which the disable digital messaging functionality operation 108 is triggered as determined by the compliance violation decision 104. Where scores are assigned to the extracted text, the sensitivity may be used to control a threshold over which a total of scores for one or more words triggers the disable digital messaging functionality operation 108. The total can include a sum or product of scores.

If the compliance violation decision 104 determines that a violation will occur if the draft digital message is sent, then the method 100 disables digital messaging functionality in the disable operation 108. This can include disabling one or more functions of the digital messaging platform or even functions of the computing device or operating system upon which the digital messaging platform is running. For instance, a "send" button in the digital messaging platform may be disabled in one embodiment (e.g., see FIG. 11), while in another embodiment, the "send" button along with the ability to open, close, or access other applications or software on the computing device can be disabled (e.g., see FIGS. 12 and 13).

Functionality that can be disabled includes, but is not limited to, restrictions within the digital messaging platform. For instance, the following may be disabled: a transmission button (e.g., a "send" button); a transmission keystroke (e.g., pressing the "ENTER" key or return key on a keyboard); a transmission command (e.g., a "send" or "enter" voice command); further text entry in the message (e.g., see FIG. 15); editing of text in the message other than the text identified as triggering the disabling (e.g., see FIG. 15); and saving of the digital message (e.g., disabling of "save as a draft" functionality), to name a few.

Functionality that can be disabled includes, but is not limited to, functionality of applications, software, and background operations (e.g., daemons and services) other than the digital messaging platform. For instance, the following may be disabled: an ability to access software other than the digital messaging platform (see FIGS. 13 and 14); an ability to switch between software (see FIGS. 13 and 14); an ability to close or minimize a window of the messaging platform (e.g., see FIG. 14); an ability to view any windows other than that of the messaging platform (see FIGS. 13 and 14); an ability to turn off, restart, or put into standby the computing device that the digital messaging platform runs on; transmission or receipt of digital messages; Internet access; access to certain websites; access to web-based software; and an ability to upload or download data to the device on which the digital messaging platform is running, to name a few.

Functionality that can be disabled includes, but is not limited to, functionality of the computer device upon which the digital messaging platform is running. For instance, the following may be disabled: power controls; volume controls; screen brightness; screen orientation; the ability for the device's display to turn off; network interfaces; network interfaces used by the digital messaging platform; network interfaces used for incoming digital messaging; network interfaces used for incoming data traffic; network interfaces used for outgoing digital messaging; and network interfaces used for outgoing data traffic, to name a few non-limiting examples. In another embodiment, disabling digital messaging functionality includes precluding a digital message from reaching a network interface of a communication device. In another embodiment, disabling digital messaging functionality includes precluding a digital message from reaching a buffer of a network interface.

Various visualizations can be used to highlight the offending text. For instance, the offending text can be highlighted with a background color, or the text font can be changed (e.g., changed to bold and/or red color). Non-offending text can have its contrast or darkness decreased in another embodiment. In some cases, a message can be presented to the user notifying the user that the draft message has been flagged as having the potential to be a compliance violation and/or that correction is required. Such a message can merely notify the user of the problem or can further include language instructing the user to rectify the potential violation. In another instance, a message can suggest changes that the user can adapt in order to correct the potential violation.

Audible signals can also be used to notify to the user the threat of, or emphasize the threat of, the draft digital message. Such audible signals can be designed to have a volume, tone, and repetition that invoke tension or anxiety in a user and thereby act as a deterrent to future potential violations. The audible signal may also have characteristics that invoke tension or anxiety in a user such that the user is incentivized not to ignore the flagged text. The audible signal may have characteristics, such as high volume, designed to be heard by others so as to act as an incentive for the user to correct the potentially noncompliant text. Such audible signals may be combined with disabling of the volume function of a device. Such audible signals may carry on until the corrected violation decision 110 determines that the flagged text is corrected. In other embodiments, the audible signal may have different characteristics at different times, where a change to a second of the two characteristics is triggered by the computing device noting that a user has begun to correct the flagged text. For instance, the audible signal may be loud and obnoxious when flagged text is first detected, but may change to a calmer less noticeable sound once a user begins editing the text, and may go silent when the corrected violation decision 110 determines that the threat of a compliance violation has been removed.

Once functionality has been disabled in the disable operation 108, the method 100 waits until the potential violation is corrected. In an embodiment, this involves a loop of the corrected violation decision 110 and the disable digital messaging functionality operation 108 until the decision 110 determines that the potential violation has been corrected. The corrected violation decision 110 may use a similar mechanism to the compliance violation decision 104 to analyze extracted text and compare this to a database of text or use more sophisticated algorithms to compare the intent or spirit of extracted text to the spirit of compliance policy or law.

In other embodiments, the corrected violation decision 110 may involve a different mechanism than the compliance violation decision 104. For instance, the corrected violation decision 110 may look for deletion or modification of the text flagged as a potential violation.

Once the corrected violation decision 110 determines that digital messaging functionality can be reestablished, the enable digital messaging functionality operation 112 is carried out. The enable digital messaging functionality operation 112 can enable any functionality disabled by the disable digital messaging functionality operation 108.

With the digital messaging functionality enabled again, the user can indicate an intent to send the digital message (e.g., via pressing a "send" button) and this input can be converted to a send digital message instruction that the device uses to send the digital message in the send digital message operation 106. In an alternative embodiment (not illustrated), the user can initiate the method 100 by pressing a "send" button or giving some other indication of a desire to send a message. The message can then be analyzed and correction of text can be required as described above or the message can be sent, all after the user indicates a desire to send the message.

The method 100 can be implemented as a module or component added on to existing messaging platforms. For instance, the method 100 can be implemented with an instant messaging platforms such as AOL INSTANT MESSAGE (AIM), MSN MESSENGER, YAHOO MESSENGER, SKYPE, and GOOGLE TALK, to name a few non-limiting examples, and with e-mail clients such as MICROSOFT OUTLOOK, MAC MAIL, and GMAIL, to name a few non-limiting examples. The method 100 can also be implemented as a module or component added on to existing web browsers such as INTERNET EXPLORER, GOOGLE CHROME, FIREFOX, AND SAFARI, to name a few non-limiting examples. The method 100 can also be implemented in headsets, cellular phones, smartphones, mobile media devices, laptop computers, desktop computers, tablet computers, ultrabooks, server systems, smart clothing, smart watches and other 'smart' accessories, to name a few non-limiting examples.

There are a variety of ways to identify a compliance violation within a message. In some embodiments, the disclosure assigns scores to words and groups of words and determines whether a total of the scores exceeds a threshold. The total can be derived as a sum of scores or as a product of scores. In some instances, additional score can be added to or multiplied by the scores to account for more complex analysis of messages. The threshold can initially be set at a server side while the systems and methods operate on client devices. However, customers may suggest changes to the threshold based on experience with previous handlings of messages. For instance, a customer may request a higher threshold where too many compliant messages are being blocked. Alternatively, where a customer has experienced serious punishment for previous violations, the customer may request a lower threshold in order to exercise greater caution regarding transmission of messages from its employees.

Scores can be assigned to individual words, groups of words, or to ideas. Ideas are abstract representations of thought that the systems and methods herein disclosed identify in messages. Ideas can be identified via a variety of means, but one embodiment looks for certain symbols to indicate an end of an idea. For instance, periods and double spaces can indicate an end of an idea. Ideas can also be identified via a message creator selecting a different user interface window than the current user interface window, selecting "ENTER", "SEND", or carriage return. These are just a few of the many symbols and actions that can be used to identify an end of an idea.

Ideas are often used to separate groups of words such that logical combinations of words are assigned scores rather than assigning scores to combinations of words that an author did not intend to be lumped together. For instance, where "set" and "index" appear in the same idea (e.g., in the same sentence) a potential violation may be likely. However, where those two words are seen in different sentences, a violation is far less likely. Thus, by analyzing combinations of terms in a given idea the systems and methods can avoid false positives.

Scores can be assigned during creation of an idea or after one or more ideas have been created. For instance, a score can be assigned to the word "set" at the start of an idea, or can be assigned to the word "set" only after an idea has been generated by a message creator.

Where scores are assigned to individual words, a database of words can be compared to words in a message, where each word in the database is associated with a score that reflects the likelihood that such a word will be seen in a non-compliant message. For instance, the word "set" may be assigned a score of half a threshold while the word, "index" may be assigned a score greater than the threshold. Thus, if "set" is found in a message, the message may not be blocked. However, if "index" is found in a message, regardless of the other words in the message, the message will be blocked. "Set" may be a "risky" word while "index" may be a "prohibited" word. In other words, risky words are those associated with scores less than the threshold, such that two or more are required to surpass the threshold. Prohibited words are those associated with scores greater than the threshold, such that these words alone can trigger blocking of a message.

In some cases a message can be blocked immediately after a total score for a message exceeds the threshold. However, since such instances may include portions of messages that appear to create violations, but will not be if the rest of the message is generated, the systems and methods herein, in some embodiments, may continue to analyze a message as it is created even if messaging functionality has been temporarily suspended. So, while messaging functionality may be disabled at one point during creation of a message, functionality may be enabled at a later point if the message or idea turns out to be compliant.

Identifying potential compliance violations in messages may account for various spellings of prohibited and risky words. For instance, the following non-exhaustive examples may all be assigned a score associated with the word "damn": damn, d.a.m.n, da [line break] mn, d a m n. Along these same lines, various spell checking modules can be used to ascertain whether text in a message represents the word that has actually been entered or recorded, or whether a typo has occurred and the intended word is other than that actually entered or recorded. In other words, the systems and methods herein disclosed can use a spell checking library (e.g., Hunspell) to identify matches in a phrase table when the recorded keystrokes are misspelled.

Figure 2:
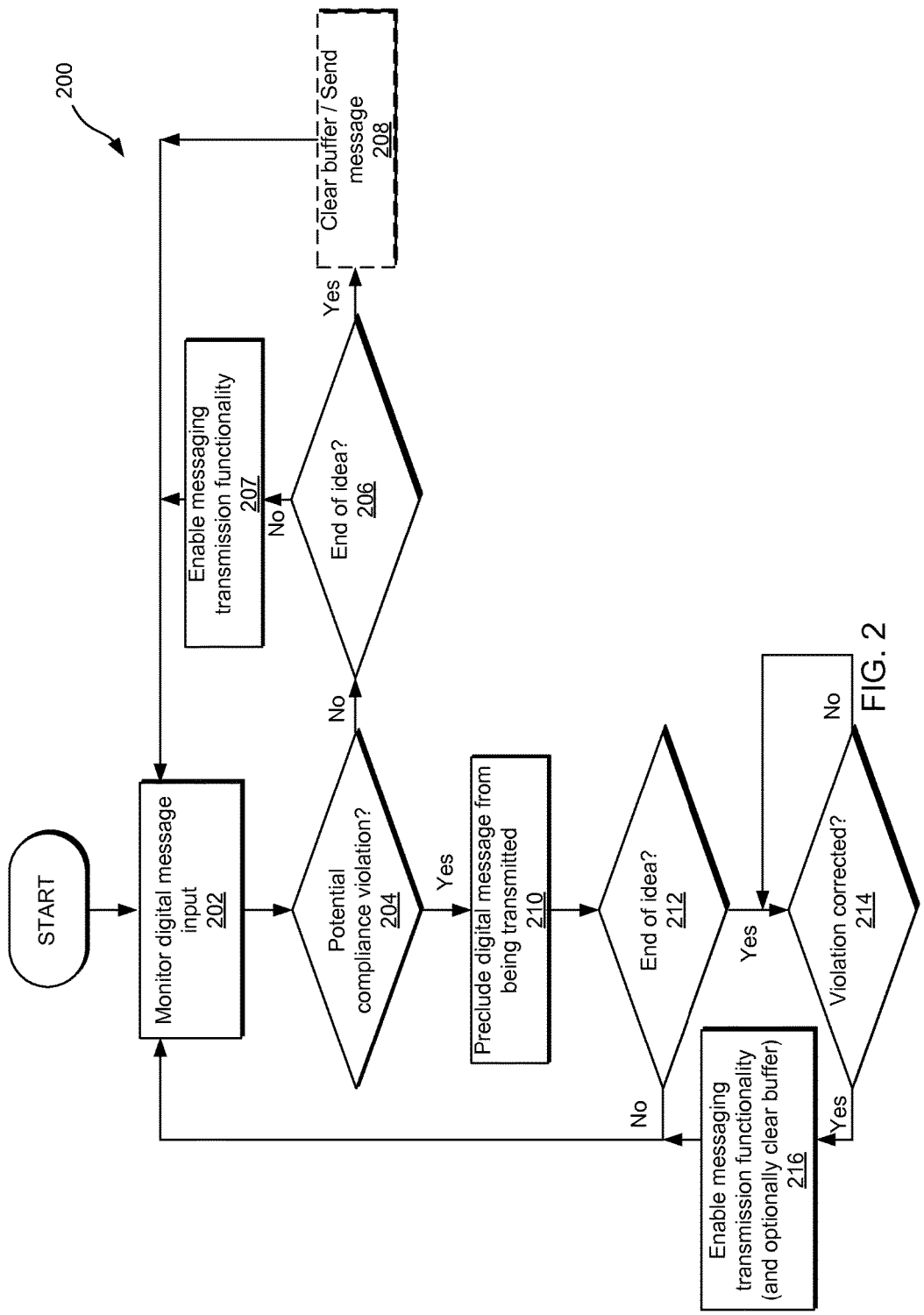
FIG. 2 illustrates a method of precluding a non-compliant digital message from being transmitted from a communication device.

FIG. 2 illustrates a method of precluding a non-compliant digital message from being transmitted from a communication device. While FIG. 2 is described in terms of a digital message, the method 200 is equally applicable to written and verbal messages as well.

In some cases, potential compliance violations can be identified as a digital message is created and before a complete idea has been formed. FIG. 2 illustrates a method of precluding a non-compliant digital message from being transmitted from a communication device. The method 200 can include monitoring an input of a digital message (Block 202). The method 200 can then determine if the digital message comprises a potential compliance violation (Decision 204). If so, then the method 200 can preclude the digital message from being transmitted from the communication device (Block 210). The method 200 can then monitor the input of the digital message to determine if the compliance violation is remedied and enable digital messaging transmission functionality of the communication device once the compliance violation is remedied. This monitoring and determination as to whether the violation has been corrected can be real-time (e.g., repeatedly assessed as further text is inputted) or can be analyzed at the end of an idea. For instance, FIG. 2 shows the variation where such determination occurs after an end of an idea is identified. In particular, after preclusion of the digital message from being transmitted (Block 210), the method determines if an end of an idea has occurred (Decision 212). If so, then the method 200 determines if the violation has been corrected (Decision 214). This determination continues until the violation has been corrected (and hence preclusion of digital messaging continues). Once corrected, the method 200 re-enables messaging transmission functionality and optionally clears the buffer of the record of keystrokes for the idea (Block 216). The method 200 then loops back to monitor the digital message input (Block 202) for a new idea.

If preclusion of the digital message from begin transmitted (Block 210) has occurred, and an end of an idea is not identified (Decision 212), then the method 200 loops back to continue monitoring the digital message input (Block 202) for the current idea.

If a potential compliance violation is found (Decision 204), the method 200 then looks to see if an end of an idea exists (Decision 206). If so, then the method 200 can loop back to continue monitoring the digital message input (Block 202) and optionally clear the buffer of data related to the idea and/or send the digital message (Block 208).

Figure 3:
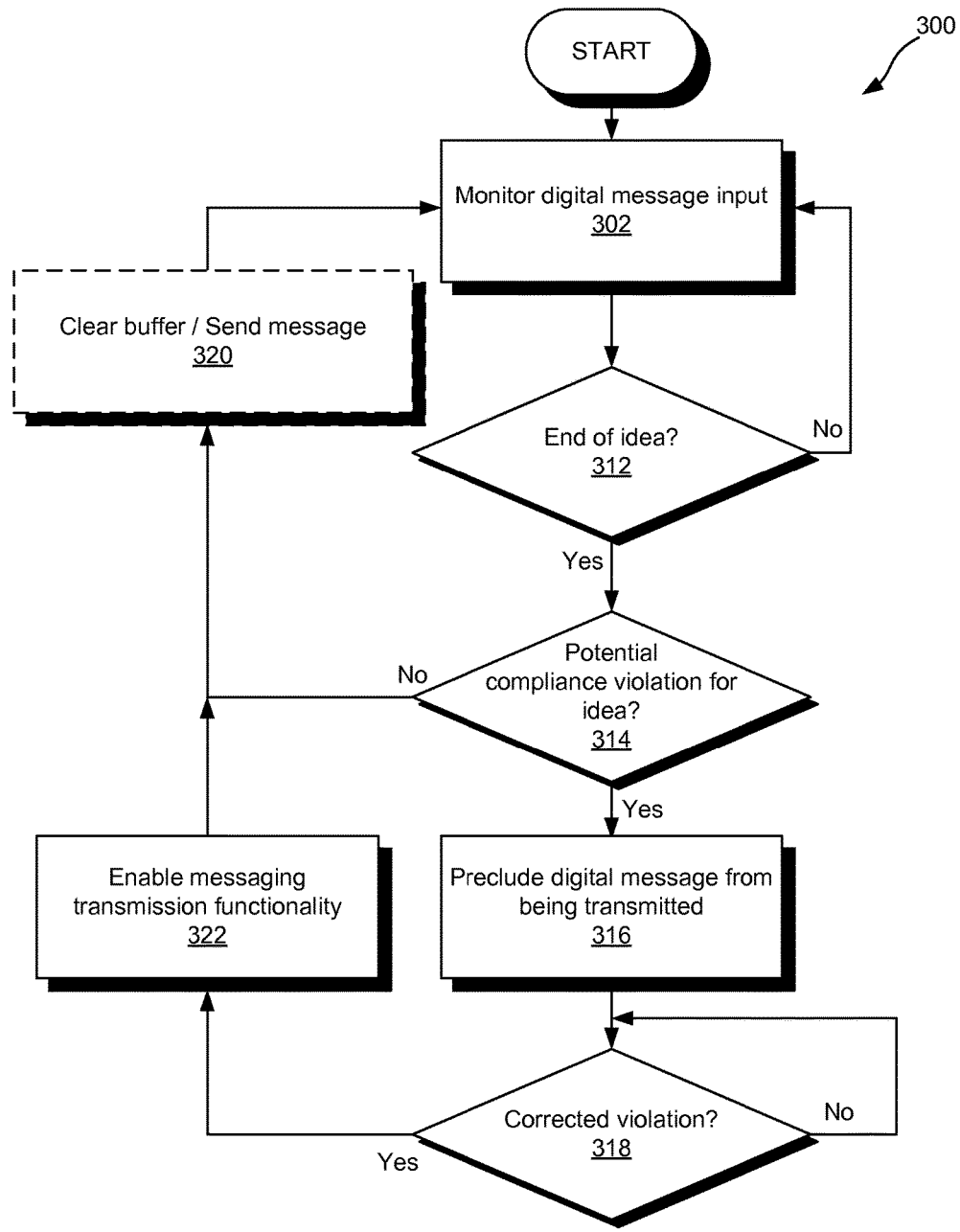
FIG. 3 illustrates another method of precluding a non-compliant digital message from being transmitted from a communication device.

In some instances, potential compliance violations can be identified during message creation but only after sufficient words have been inputted to form a complete idea. FIG. 3 illustrates another method of precluding a non-compliant digital message from being transmitted from a communication device. The method 300 includes monitoring a digital message input (Block 302) and identifying an end of an idea (Decision 312). Once an idea has been identified (Decision 312), the method 300 determines if the content of the idea contains a potential compliance violation (Decision 314). If not, then the method 300 can loop back to continue monitoring the digital message input (Block 302) and optionally clear the buffer of data related the current idea and/or send the message (Block 320).

If a potential compliance violation is found in the idea (Decision 314), then the method 300 precludes digital messages from being transmitted (Block 316). The method 300 then monitors the digital message input until the violation is corrected (Decision 318) and then enables messaging transmission functionality (Block 322). The method 300 then loops back to continue monitoring the digital message input and optionally clears the buffer of any data related to the idea and/or sends the message (Block 320).

Precluding digital messages from being transmitted (Block 316) may include disabling a messaging functionality of the communication device.

Figure 4:
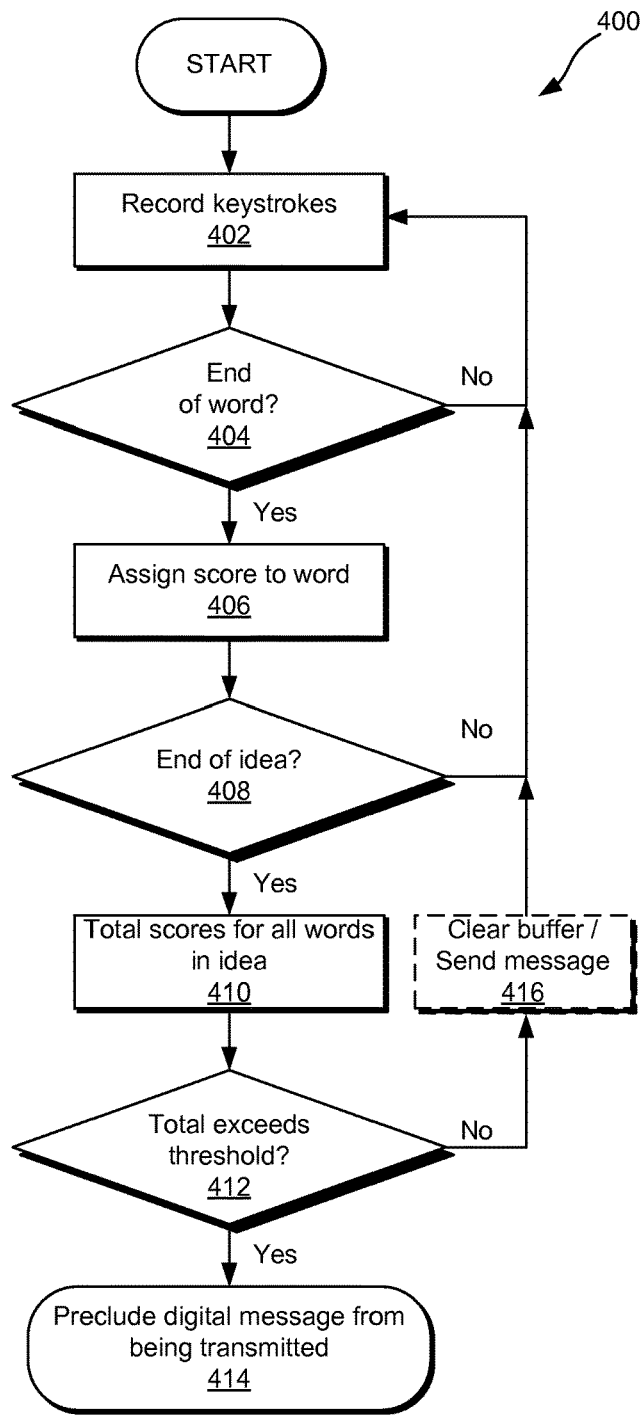
FIG. 4 illustrates a method of precluding a non-compliant digital message from being transmitted from a communication device.

In other embodiments, potential compliance violations can be identified by assigning scores to words and sets of words in complete ideas and totals of the scores can be compared to a threshold. FIG. 4 illustrates a method of precluding a non-compliant digital message from being transmitted from a communication device. The method 400 can include recording keystrokes on a first computing device (Block 402). The keystrokes can be part of a digital message. However, the method 400 is also applicable to written and verbal messages. The method 400 can further include identifying an end of a word (Decision 404). For each word, a score is assigned (Block 406). As words are assigned scores, the method 400 also looks for ideas (Decision 408) and when one is found, the method 400 totals the scores for all words in the idea (Block 410). The total is then compared to a threshold (Decision 412) and if the total exceeds the threshold, then the method 400 precludes the digital message from being transmitted (Block 414). If the total does not exceed the threshold, then the method 400 can optionally clear the buffer of data related to the idea and/or sends the message (Block 416). However, in some cases, the method 400 can go on recording keystrokes (Block 402) and continue identifying potential violations without clearing the buffer or sending the message. For instance, an idea may be identified via recording the entry of a period (an end of a sentence). But rather than treat the next sentence as a standalone idea, the method 400 can analyze multiple sentences to determine potential compliance violations. Hence, clearing of the buffer (Block 402) is optional.

When assigning scores, words, combinations of words, or phrases that are deemed "prohibited" can be assigned scores equal to or greater than the threshold. In this way, the existence of a single prohibited word, group of words, or phrase, will trigger the preclusion of the digital message from being transmitted (Block 414). Words, groups of words, or phrases deemed "risky" are those in which at least two or more such words or groups of words are needed in a given idea in order for the idea to form a potentially non-compliant message. These risky words, groups of words, or phrases can be assigned scores less than the threshold. Thus, two or more risky words, groups of words, or phrases are needed in a single idea in order for the total to exceed the threshold. While the method 400 looks at total scores for a given idea, in other embodiments, totals can be compared to a threshold across multiple ideas (e.g., two or more sentences).

Identifying an end of a word (Decision 404) may involve parsing the keystrokes into words and symbols.

Figure 5:
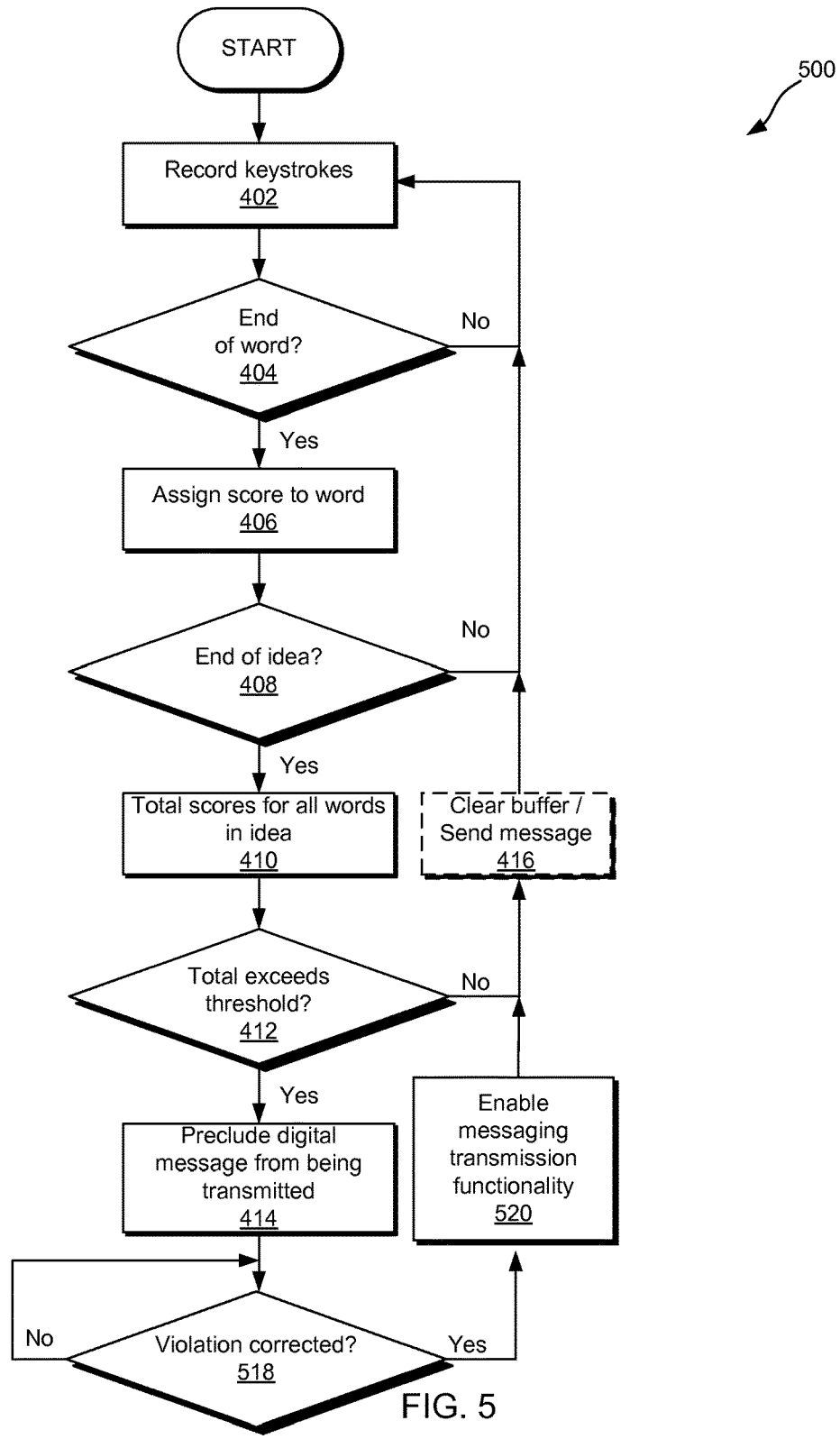
FIG. 5 illustrates another method of precluding a non-compliant digital message from being transmitted from a communication device.

FIG. 5 shows a method similar to that of FIG. 4, but further including the ability to enable messaging functionality if a potential compliance violation is corrected. The method 500 is identical to the method 400 until the preclusion of the digital message from being transmitted. The method 500 then monitors the digital message to see if the violation is corrected (Decision 518). If the violation is corrected, then the method enables the messaging transmission functionality (Block 520). The method 500 then loops back to recording keystrokes (Block 402) and can optionally clear the buffer of data related to the idea and/or send the message (Block 416).

Figure 6:
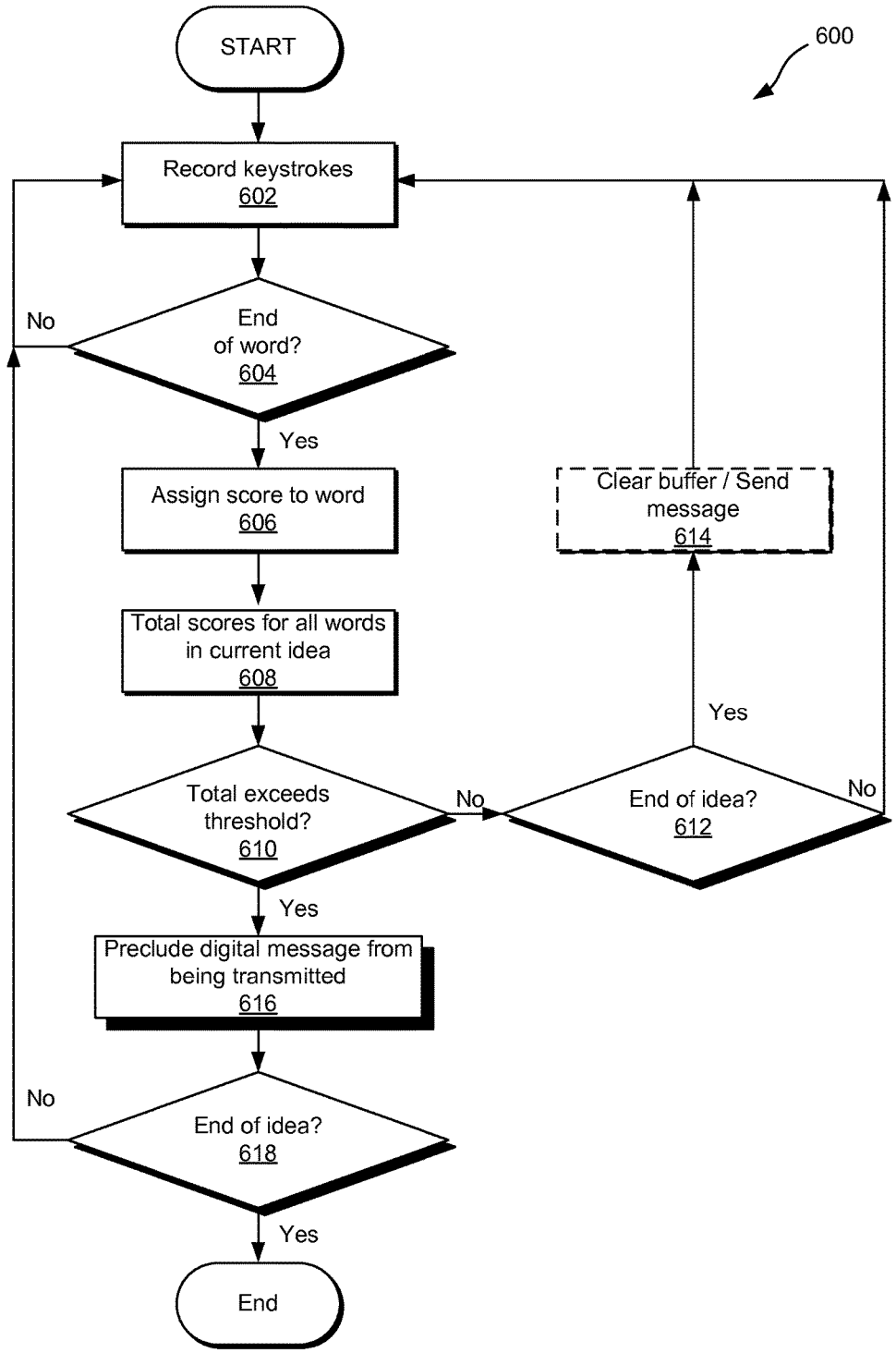
FIG. 6 illustrates yet another method of precluding a non-compliant digital message from being transmitted from a communication device.

In other embodiments, potential compliance violations can be identified by assigning scores to words and sets of words as messages are generated and comparing these totals to thresholds even before completion of an idea. FIG. 6 illustrates yet a further embodiment of a method of precluding a non-compliant digital message from being transmitted from a communication device. The method 600 can include recording keystrokes on a first computing device (Block 602). The keystrokes can be part of a digital message. However, the method 600 is also applicable to written and verbal messages, the former by applying the method to all text in a written message, and the latter by applying the method in combination with an interpreter for converting spoken words to text. The method 600 can further include identifying an end of a word (Decision 604). For each word, a score is assigned (Block 606). The method 600 totals the scores for all words in the current idea (Block 608). The total is then compared to a threshold (Decision 610) and if the total exceeds the threshold, then the method 600 precludes the digital message from being transmitted (Block 616). The method 600 then determines if an end to the current idea has been identified (Decision 618). If so, then the method 600 ends, with digital messaging functionality disabled. However, if the idea is not at an end (Decision 618), then the method 600 continues recording keystrokes (Block 602) and looking for potential compliance violations.

Returning to the threshold comparison, if the total does not exceed the threshold (Decision 610), then the method 600 looks for an end of the current idea (Decision 612). If no end has been found, then the method 600 continues recording keystrokes (Block 602). If the method 600 has reached an end of the current idea (Decision 612), then the method 600 can optionally clear the buffer of data related to the idea and/or sends the message (Block 614). However, in some cases, the method 600 can go on recording keystrokes (Block 602) and continue identifying potential violations without clearing the buffer or sending the message. For instance, an idea may be identified via recording the entry of a period (an end of a sentence). But rather than treat the next sentence as a standalone idea, the method 600 can analyze multiple sentences to determine potential compliance violations. Hence, clearing of the buffer (Block 614) is optional.

Figure 7:
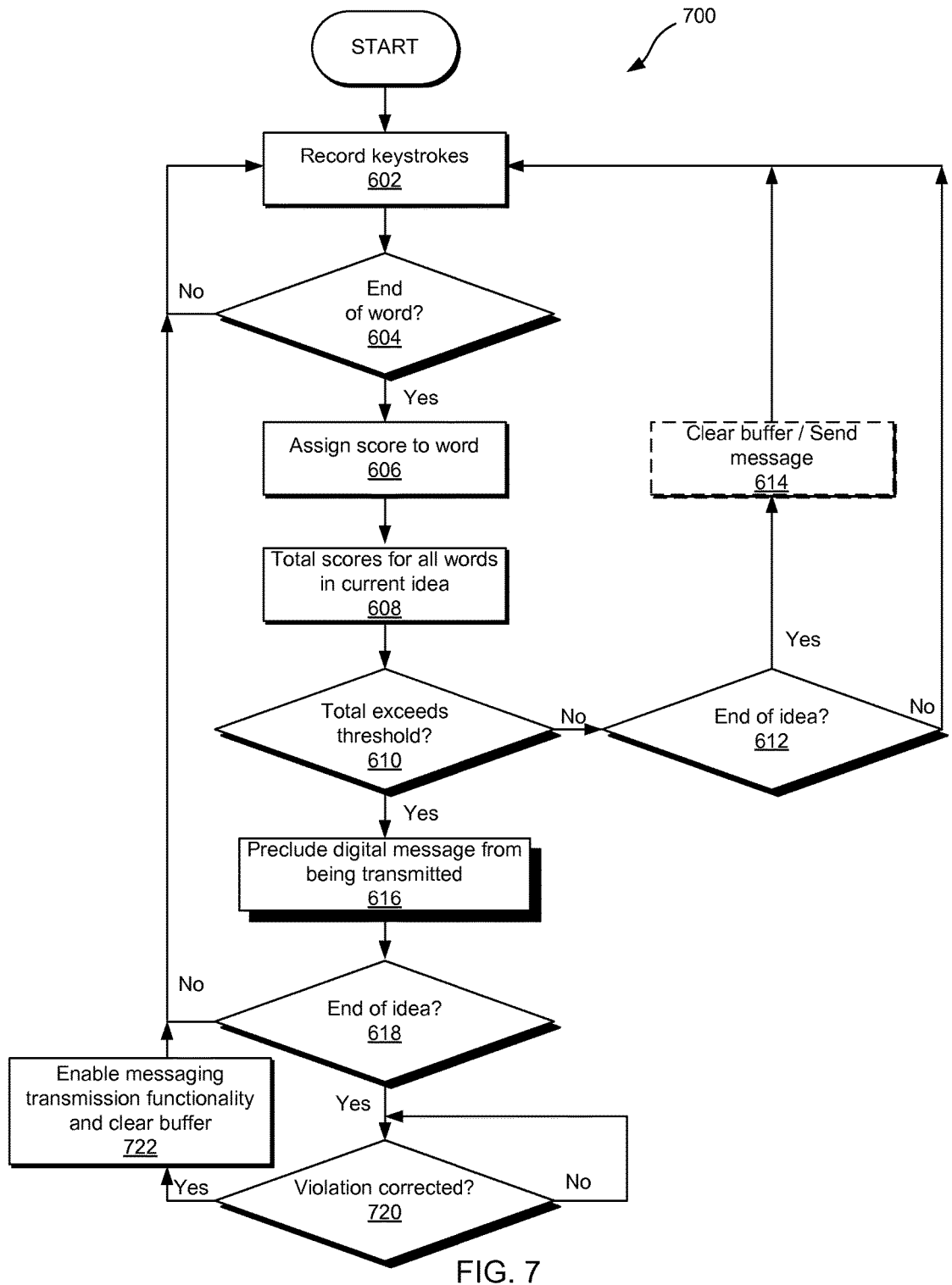
FIG. 7 illustrates yet another method of precluding a non-compliant digital message from being transmitted from a communication device.

FIG. 7 shows a method similar to that of FIG. 6, but further including the ability to enable messaging functionality if a potential compliance violation is corrected. The method 700 is identical to the method 700 until the end of an idea is identified (Decision 618) and the total exceeds the threshold (Decision 610). At this point, the method 700 looks for correction of the violation (Decision 720) rather than coming to an end. If the violation is corrected, then the method 700 enables messaging transmission functionality (Block 722) and optionally clears the buffer and/or sends the message.

Figure 10:
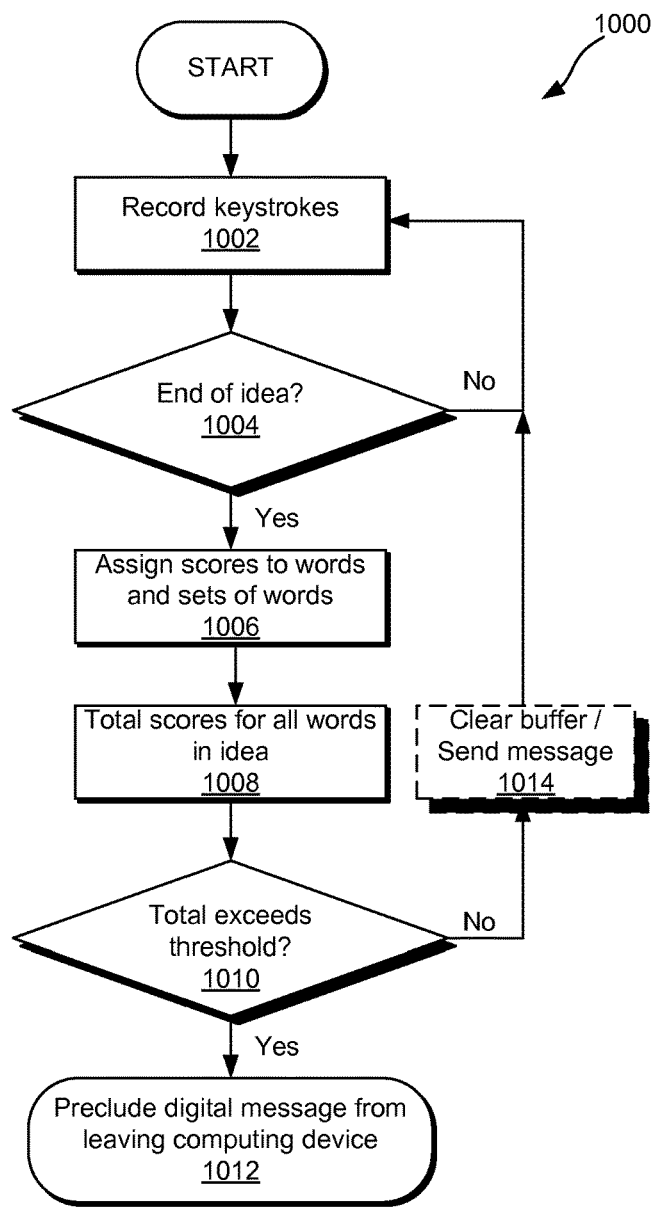
FIG. 10 illustrates yet another method of precluding a non-compliant digital message from being transmitted from a communication device.

In some embodiments, an idea can be identified before scores are assigned to words and sets of words within the idea. FIG. 10 illustrates a method of precluding a non-compliant digital message from being transmitted from a communication device The method 1000 can include recording keystrokes on a first computing device (Block 1002). The keystrokes can be part of a digital message The method 1000 can further include identifying an end of a block of keystrokes representing an idea (Block 1004). The method 1000 can also include assigning a score to each of the words (Block 1006). The method 1000 can further include calculating a total of the scores assigned to each of the words and or groups of words in the idea (Block 1008). The method 1000 can yet further include determining that the total exceeds a threshold (Block 1010). If the total exceeds the threshold, then the method 1000 precludes the message from leaving the computer device (Block 1012). If the total does not exceed the threshold then the buffer can be optionally cleared of data related to the idea and/or the message can be sent (Block 1014). However, in some cases, the method can go on recording keystrokes (Block 1002) and continuing identifying potential violations without clearing the buffer or sending the message. For instance, an idea may be identified via recording the entry of a period (an end of a sentence). But rather than treat the next sentence as a standalone idea, the method 1000 can analyze multiple sentences to determine potential compliance violations. Hence, clearing of the buffer (Block 1014) is optional.

Some aspects of the invention describe ways to optimize a model for identifying potential compliance violations. In particular, feedback from compliance experts can be crowdsourced through the application of the systems and methods herein disclosed. Previous attempts to automatically preclude dissemination of potentially non-compliant messages suffer from an inability to create accurate models for identifying potentially non-compliant messages. One way to accomplish this is to manually flag hundreds of thousands of messages and then allow a model to optimize its parameters based on these manually-flagged messages. However, the resources to perform such manual flagging are not available in the art. The inventors in contrast recognized that customers for such a non-compliant message preclusion system could perform the manual flagging.

Thus, one aspect of the disclosure is a method that includes assigning scores to words and combinations of words in a message, before the message is sent, in order to determine if the message is potentially in violation of compliance. The method can further include running one or more messages through an algorithm that determines which of the messages are potential violations of compliance policies. The results can be provided to compliance experts within customer entities. The system can then receive feedback from the compliance experts indicating an accuracy of the results. Using this feedback, the model can adjust the scores that are assigned to words and groups of words. This process can be repeated for a plurality of customers (and the tens of thousands of messages that each customer sends through the model), thereby obtaining a set of scores for words and combinations of words that have been trained by a large number of compliance experts.

Figure 8:
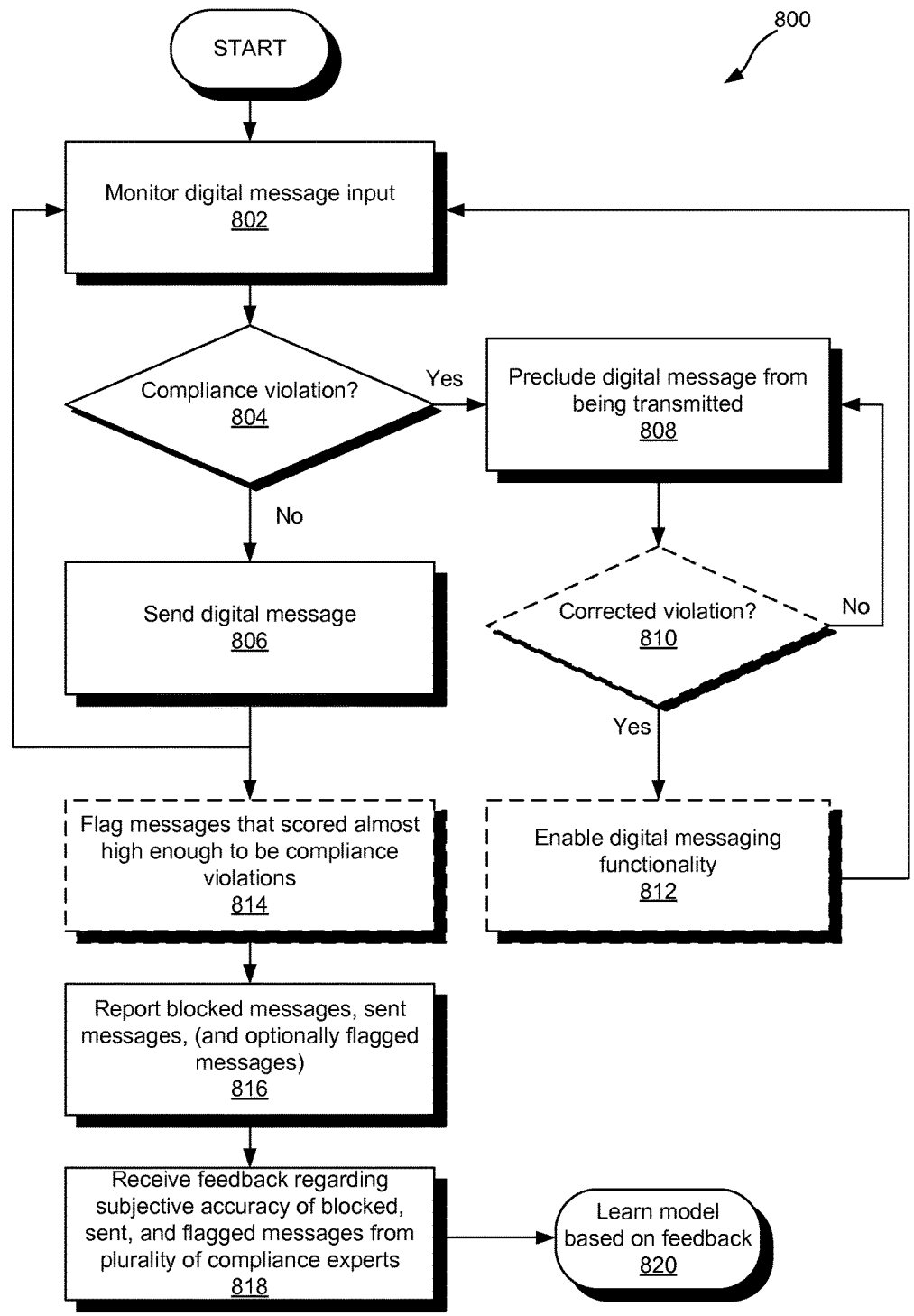
FIG. 8 illustrates yet another method of precluding a non-compliant digital message from being transmitted from a communication device.

FIG. 8 illustrates a method for optimizing a model that is used to identify potential compliance violations. The method 800 includes monitoring a digital message input (Block 802) and identifying a compliance violation (Block 804). Given a violation, the method 800 precludes a current digital message from being transmitted (Block 808). The method 800 then optionally waits for the violation to be corrected (Decision 810), and optionally enables digital messaging functionality (Block 812) once the violation is corrected. Whether the optional aspects of the method 800 occur or not, the method 800 then continues to monitor the digital message input (Block 802). When a compliance violation is not observed for a given message (Decision 804), the method 800 allows the digital message to be sent (Block 806) and continues to monitor subsequent messages (Block 802). After each instance of a message being sent (or optionally after a message being blocked or flagged or after a period of time or number of messages have been passed through the method 800) the method 800 optionally flags messages that were assigned scores that almost exceeded a threshold (e.g., within 5%, within 10%, within 15%, or within 20% of the threshold) (Block 814). The method 800 then reports blocked messages, sent messages, and optionally flagged messages (Block 816). The reporting can be made to customers and in particular to one or more compliance experts of a customer. The compliance expert(s) can then review the report and provide feedback. Such feedback can include indications of words or combinations of words that should be considered prohibited or risky, to name one example. The method 800 can then receive the feedback, which indicates a subjective accuracy of blocked, sent, and optionally flagged messages from a plurality of compliance experts. The method 800 then learns the model based on this feedback (Block 820).

In the various methods of FIGS. 1-8 and 10, once a potentially non-compliant message is identified, further message input can be disabled as well as message transmission functionality. For instance, further text input may be prevented or the offending text may be automatically deleted. Where offending text is deleted, this text may also be removed from a buffer of the computing device, or removed from a messaging buffer but added to a reporting buffer that is later used to generate reports for the customer. In some cases, all additional inputs to a computing device, including all mouse and touch-based inputs may be disabled. In some cases, all message transmission inputs (e.g., a "SEND" button) can be disabled.

Figure 9:
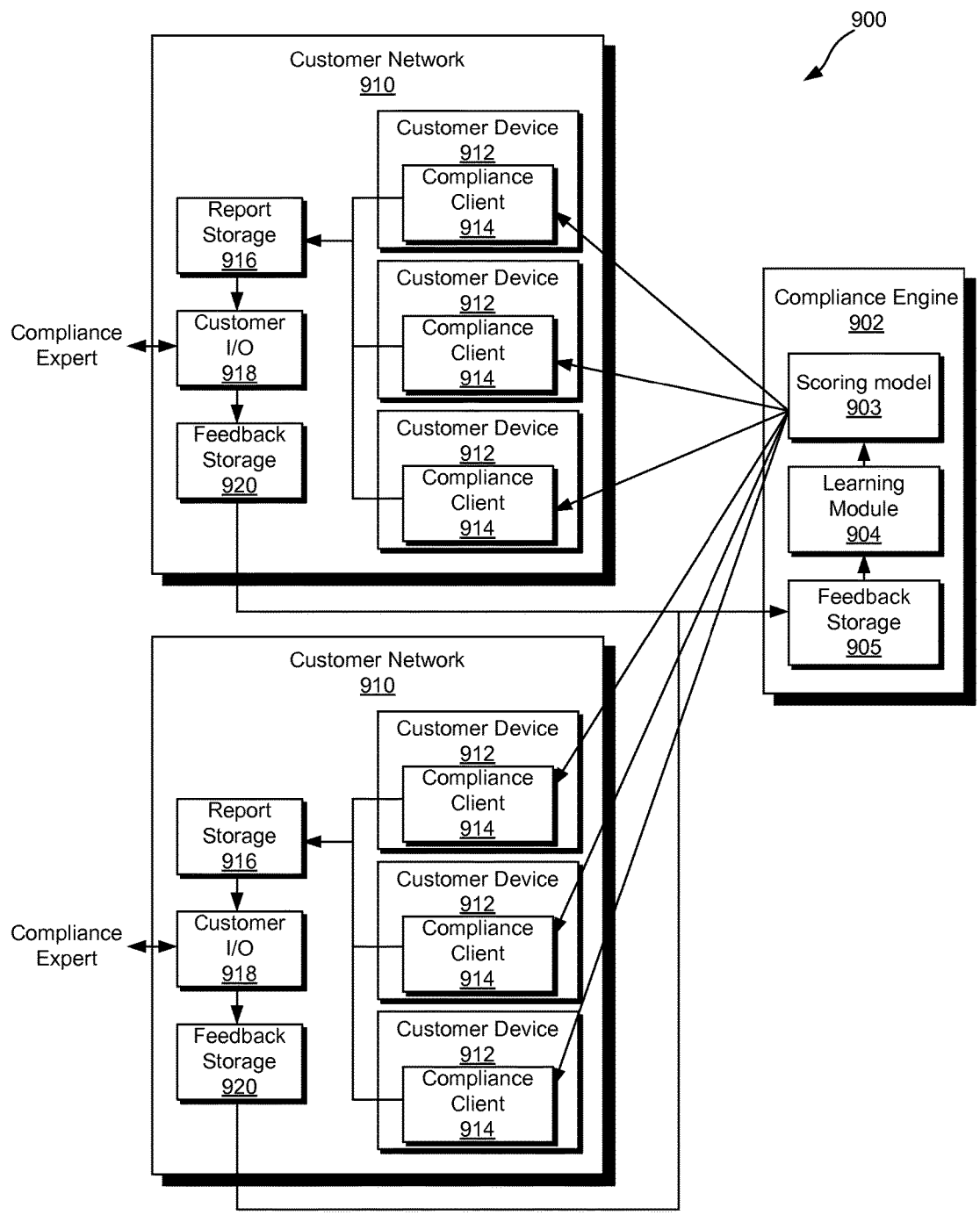
FIG. 9 illustrates a system for identifying potential compliance violations in digital messages and precluding transmission of such messages while the potential violation exists.

FIG. 9 illustrates a system for identifying potential compliance violations in digital messages and precluding transmission of such messages while the potential violation exists. The system 900 can include a compliance engine 902 configured as a server in a client-server relationship with a plurality of customer networks 910 (only two of which are shown). The compliance engine can be configured to maintain a model that is used by compliance clients 914 to identify potentially non-compliant messages being created on the customer networks 910. The compliance clients 914 can then block messages that are identified as non-compliant or identified has having non-compliant messages in them. Blocking a message means that the message is unable to leave the customer network 910 and in many embodiments means that a message is unable to leave a customer device 912 on which the message is created. Prior art filtering systems tend to analyze messages, such as e-mail, once the message has reached an intermediary server (e.g., before the message reaches a recipient, but after it leaves the device on which the message was created) or location (e.g., for preventing phone calls from reaching a location that would lead to a compliance violation). For many compliance situations, these filters are inadequate since a message that is stored on an intermediary server, even if it never reaches its recipient, still constitutes a compliance violation. For instance, in financial services, an instant message that is filtered at an intermediary server, but before reaching a recipient, is still a compliance violation since it has been stored on a device that is visible to compliance officials. Similarly, even if a message reaches a company's internal server and is then blocked, that company may still be required to report non-compliant messages to federal agencies, even though the message never left the company's control. Therefore, the herein disclosed systems and methods build upon the prior art by preventing potentially non-compliant messages from ever leaving a device on which they are created.

The compliance engine 902 can include a scoring model 903, a learning module 904, and a feedback storage 905. The scoring model 903 can be replicated on the compliance clients 914, which each reside on a customer devices 912, where there can be one or more customer devices 912 on each customer network 910. Three customer devices 912 are shown on each customer network 910, but fewer or more customer devices 912 can also be implanted.

As a user creates a message on a customer device 912 (e.g., a mobile phone or a desktop computer with an instant messaging platform, to name two non-limiting examples), the compliance client 914 can monitor the message and preclude message transmission or messaging functionality if a potential compliance violation is identified in the message (e.g., preclude the message from reaching a network interface of the customer device 912 or a messaging buffer of the customer device 912). Such analysis can occur in real time or after a certain trigger. For real time analysis, each word or groups of words can be analyzed as they are created without waiting for a trigger. Where a trigger is used, the trigger can be the completion of an idea, an attempt to send the message, or an attempt to navigate away from a user interface window in which the message was being created.

In some cases the compliance client 914 can disable messaging functionality, but remain open to the possibility that the message may turn out to be compliant, and thus later enable messaging as message creation continues. Alternatively, the compliance client 914 can disable both messaging and further text input (and/or the ability to change user interface windows) whenever a potential compliance violation is identified. In these cases, the compliance client 914 may monitor for corrections of the violation (e.g., a user deleting non-compliant text) and then enable messaging once the potential violation has been removed. In other instances, the compliance client 914 may remove the portion of a message that creates the potential violation. In this variation, messaging functionality may be re-enabled once the compliance client 914 has automatically removed the potentially offending portion of the message.

The scoring model 903 can be updated by the learning module 904, for instance by increasing or decreasing scores that are assigned to words or groups of words. Updates might also include changes to the groups of words that are assigned scores or to the relationships between words that are associated with certain scores. Other updates to scoring in the scoring model 903 can also be made. The learning module 904 can base its actions on the feedback storage 905, where feedback is provided by the customer networks 910. The feedback can include subjective feedback regarding an accuracy of the compliance clients' 914 actions. For instance, feedback may include indications that certain words or combinations of words are being given too much weight. In another example, feedback may include a request that certain words be deemed prohibited words, and thus that such words be assigned scores that are above the threshold. Feedback may also include requests or suggestions that the threshold be raised or lowered.

The feedback can be used to update the scoring model 903 for all compliance clients 914 across all customer networks 910, updates can be unique to each customer network 910, or both. For instance, one customer may provide feedback including a request to change the threshold or to change the scoring associated with a particular term, and the scoring model 903 can be updated for the customer network 910 associated with the request, but remain unchanged for all other customer networks 910. Updates to the scoring model 903 can be pushed to the compliance clients 914 on each customer network 910. Updates that are pushed to the compliance clients 914 can include updated phrase templates.

So that customers can review the effectiveness of the compliance clients 914, reports can be provided to each customer and the customer can provide feedback that can be used to influence and train the scoring model 903. Each customer network 910 can include a report storage 916, a customer input-output 918 (I/O), and a feedback storage 920. The compliance clients 914 can provide data regarding those messages that were blocked, transmitted, and optionally flagged to the report storage 916 for each customer network 910. Reported data can also include parameters of the model such as the threshold and scores that are being used. This data can be provided to the customer I/O 918 as a report and thereby presented to the customer (e.g., to one or more compliance experts of the customer). The customer can provide subjective feedback regarding the report via the customer I/O 918 and this feedback can be stored in a feedback storage 920 of the customer network 910. The feedback is then passed to the compliance engine 902 and stored in a feedback storage 905 of the compliance engine 902. Feedback from the plurality of customer networks 910 can be provided such that the learning module 904 is able to optimize the scoring model 903 based on feedback from a large number of customer networks 910 and potentially a large number of compliance experts. In other words, the job of providing subjective manual feedback can be crowd-sourced using the customers as the crowd. This saves time and money as compared to previous attempts to automatically filter non-compliant messages, and in fact makes this automated process possible where the resources simply did not exist to perform this message blocking via prior art methods.

In some embodiments, the scoring model 903 can be trained even before a first use of the compliance clients 914 with real-time messages occurs. For instance, the customer can run one or more compliance clients 914 on previously-transmitted messages and then provide feedback based on reports for these previously-transmitted messages. In this way, the scoring model 903 can be trained for different customers before compliance clients 914 are activated for real-time message blocking.

In some embodiments, the compliance clients 914 can flag ideas, messages, or words that are close to surpassing the threshold, but do not actually surpass the threshold. When these flagged ideas, messages, or words are provided in a report to the customer and a compliance expert, the customer can provide feedback relative to these flagged ideas, messages, or words (e.g., a flagged word should have been scored as a prohibited word) and thus an added level of feedback can be provided for training the scoring model 903.

The customer devices 912 can include various computing devices such as communication devices. A few non-limiting examples include cellular phones or smartphones, tablet computers, and desktop computers. Other examples include fax machines and voice recorders.

The customer networks 910 can be private or local area networks and optionally are firewalled or otherwise isolated from each other. In some embodiments, a customer network 910 can include public network connections between internal components, for instance, where one or more customer devices 912 are connected to the report storage 916 via the Internet.

Figure 11:
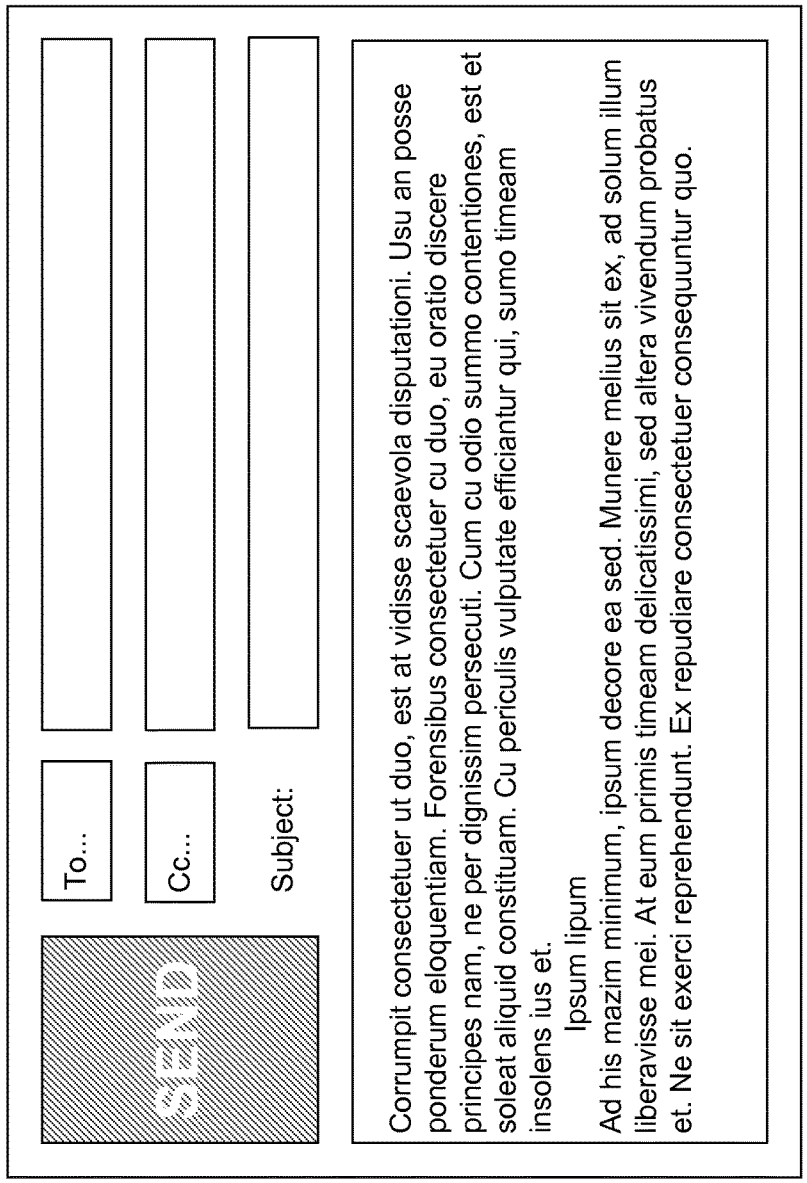
FIG. 11 illustrates an embodiment of a digital message with at least one digital messaging function disabled.

FIG. 11 illustrates an embodiment of a digital message with at least one digital messaging function disabled. In particular, an ability to send the digital message has been disabled. In the illustrated embodiment, this includes a visual indicator that the send functionality has been disabled, although in other instances the functionality can be disabled without an accompanying visual indicator.

Figure 12:
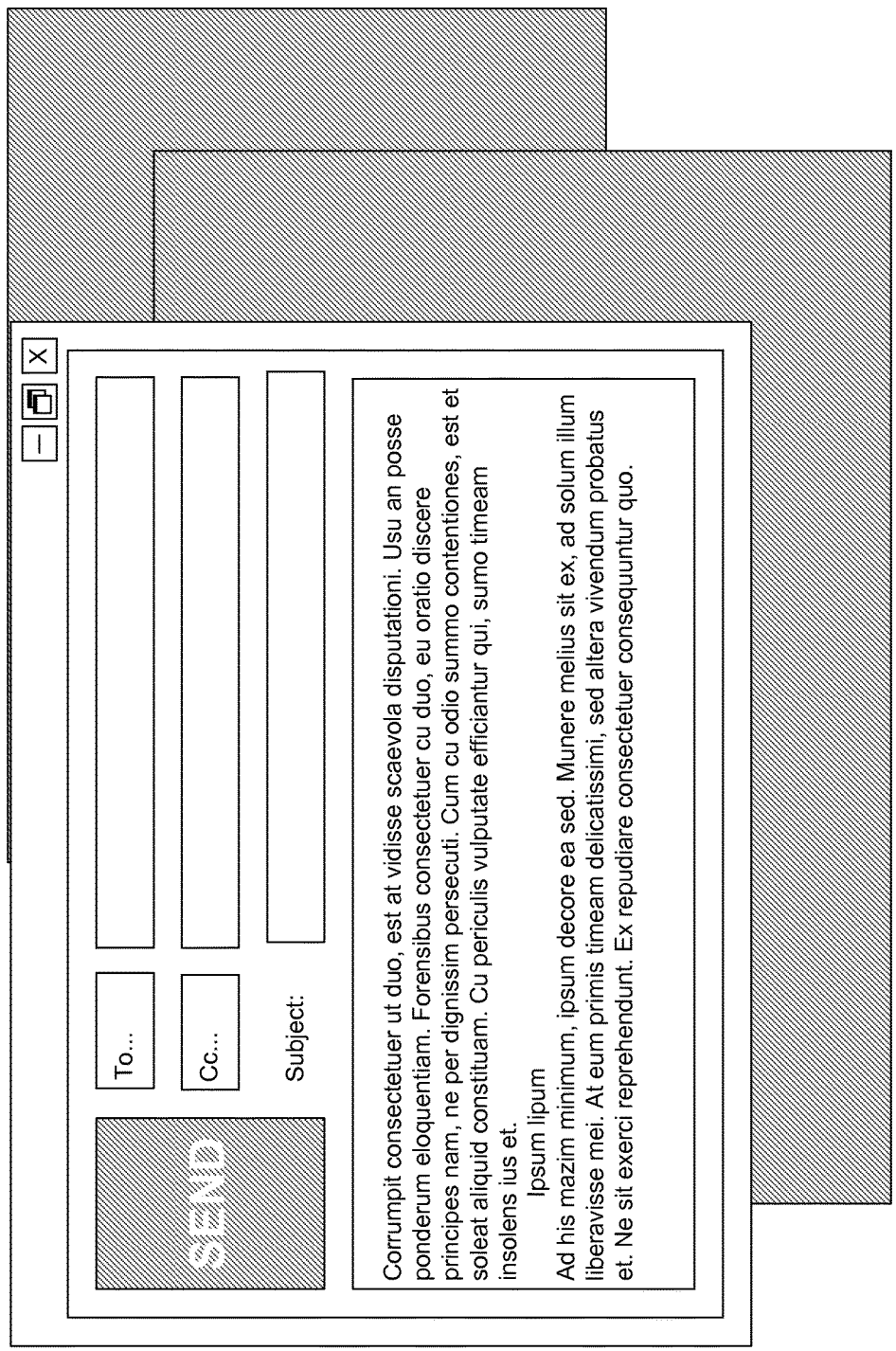
FIG. 12 illustrates another embodiment of a digital message with at least one digital messaging function disabled.

FIG. 12 illustrates another embodiment of a digital message with at least one digital messaging function disabled. In particular, an ability to send the digital message has been disabled along with an ability to access other windows or other open programs on a computing device. The illustrated embodiment also includes a visual indicator indicating that the other windows and/or other applications are not accessible, although such visual indicator is not required. In some cases, the visual indicator may be a mere change in color or contrast of the other windows or applications. As illustrated, the visual indicator covers or blocks viewing of the contents of the other windows or applications, although this is not required.

Figure 13:
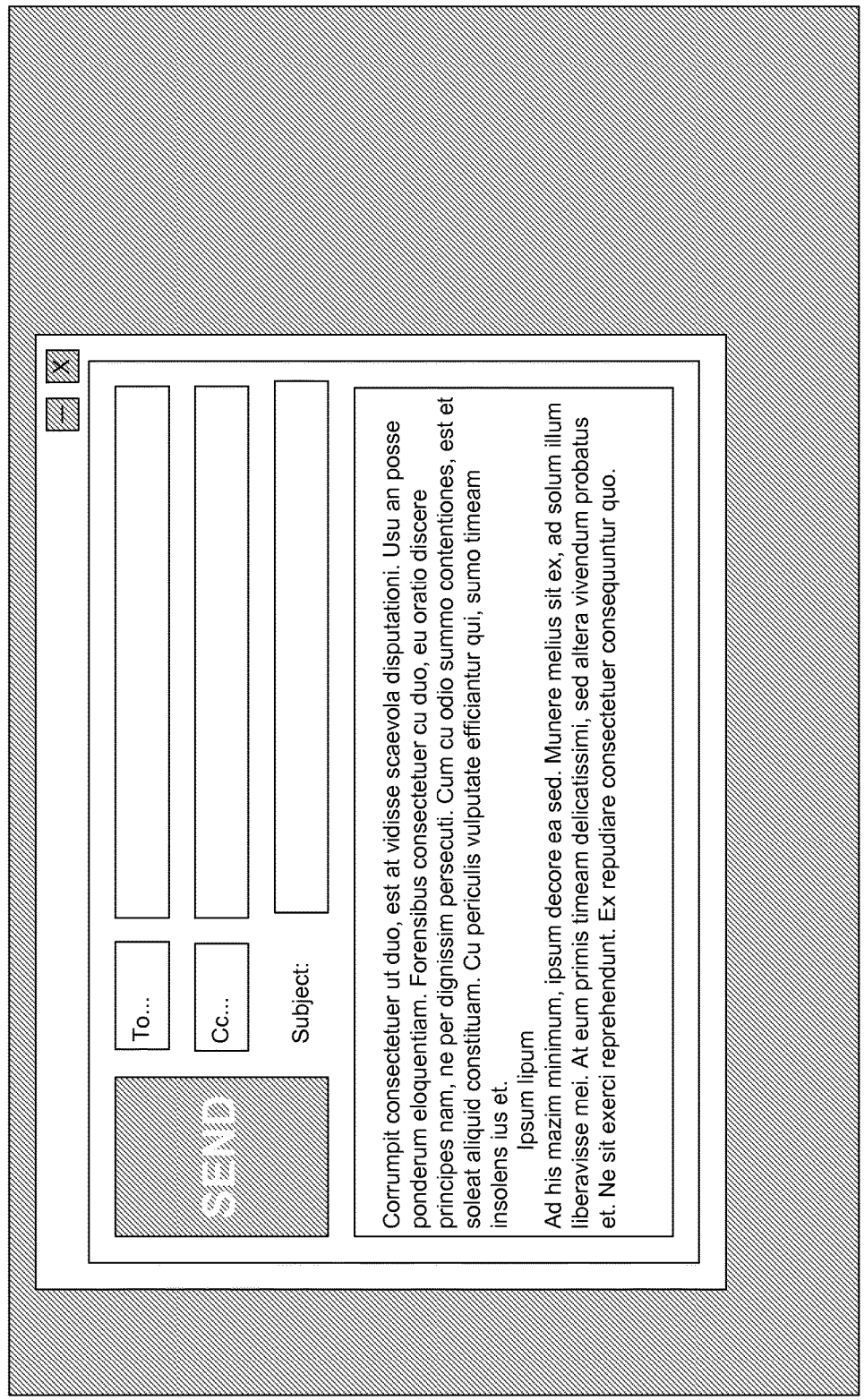
FIG. 13 illustrates yet another embodiment of a digital message with at least one digital messaging function disabled.

FIG. 13 illustrates yet another embodiment of a digital message with at least one digital messaging function disabled. In particular, an ability to send the digital message has been disabled along with an ability to access any other functionality or applications on the computing device as well as an ability to minimize or close the instant window. The illustrated embodiment includes a visual indicator that other functions of the device are disabled, although this is not required.

Figure 14:
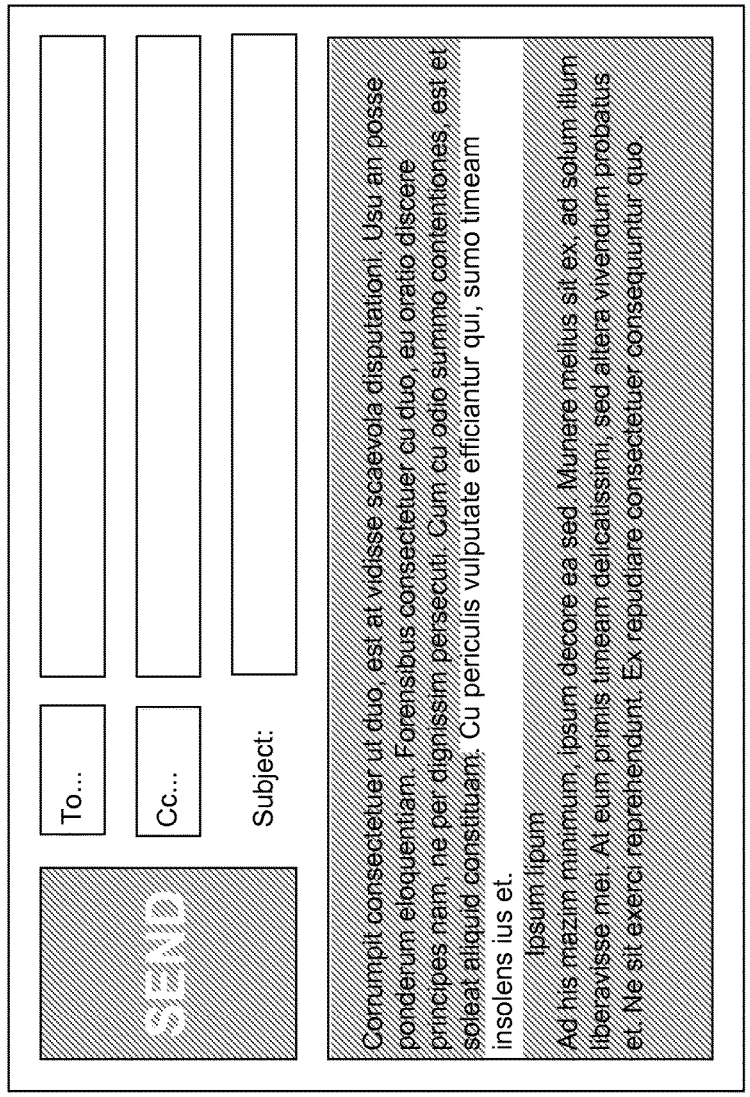
FIG. 14 illustrates yet another embodiment of a digital message with at least one digital messaging function disabled.

FIG. 14 illustrates yet another embodiment of a digital message with at least one digital messaging function disabled. In particular, an ability to send the digital message has been disabled along with an ability to edit non-flagged text or to add text to the digital message. In other words, the user is only able to edit the flagged text in this embodiment. In this illustration, flagged text is that text that is not overlapped with a cross-hatched background; non-flagged text includes a darkened or cross-hatched background.

FIG. 15 illustrates an embodiment of a digital messaging platform with at least one digital messaging function disabled. The illustrated embodiment can have instant messaging or chat room functionality and can show contacts, other users, and/or various chat rooms in one window and a chain of instant messages in another window, although these features and the illustrated arrangement are not required. The User's previous digital messages can be seen along with digital messages from other users (e.g., Porthos and Moe). The User has entered text that has been flagged as a potential violation of compliance policy or laws (for instance as determined by the compliance violation operation 104 in FIG. 1). The flagged text has also been highlighted. Although not illustrated, the ability for this digital message to be sent has been disabled. For instance, pressing the "enter" or return key or giving a send or transmit voice command may have no effect as these functions may have been disabled. As such, the offending message cannot be sent and hence cannot be logged or create a violation. The disabling may carry on until the User corrects the potentially violating text. Alternatively, a "send" button, or various other functionality that is not illustrated or not visible in the illustration, may be disabled as a result of the potentially non-compliant text being flagged.

Figure 16:
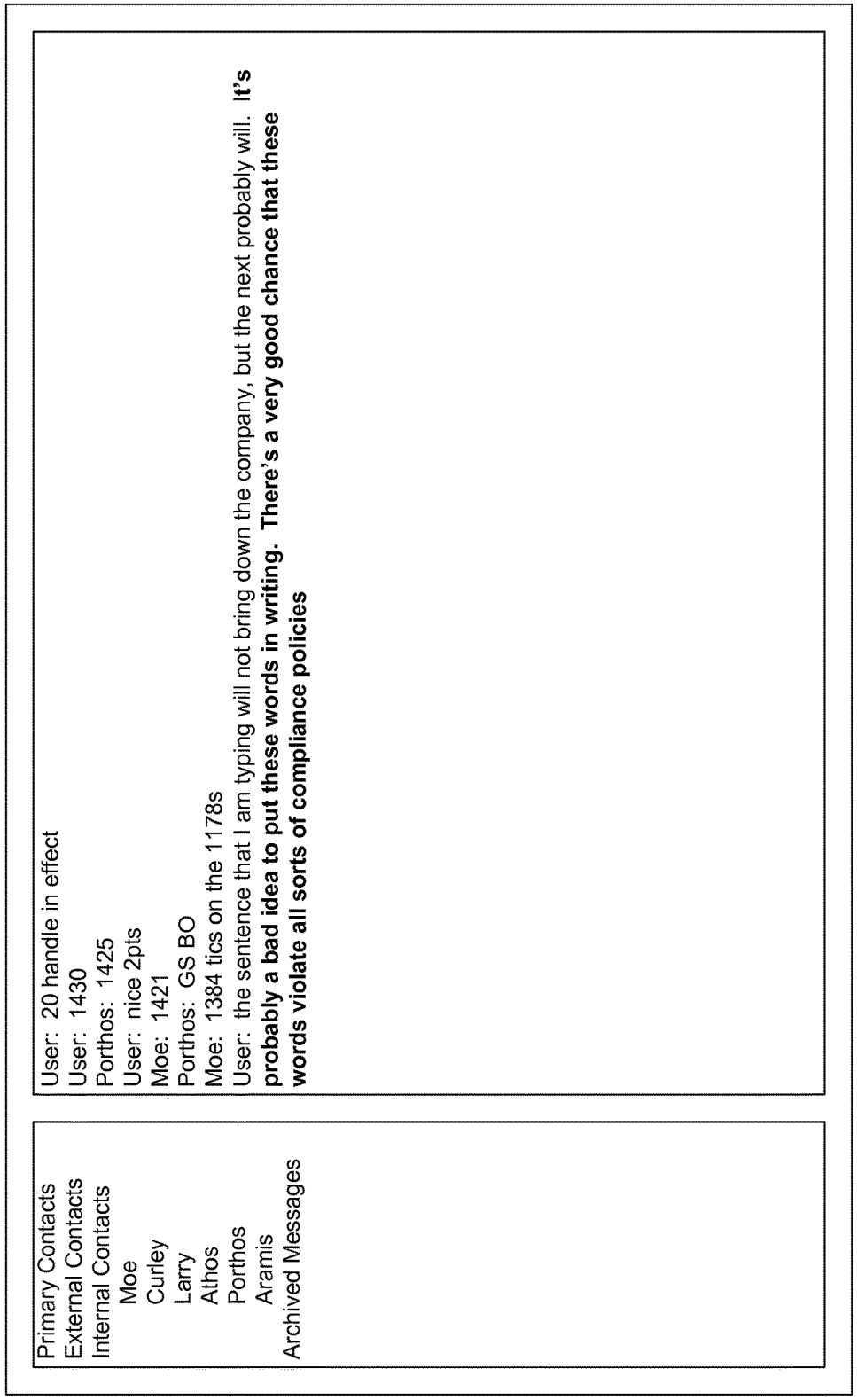
FIG. 16 illustrates another embodiment of a digital messaging platform with at least one digital messaging function disabled.

FIG. 16 illustrates another embodiment of a digital messaging platform with at least one digital messaging function disabled. Like FIG. 15, the illustrated embodiment can have instant messaging or chat room functionality and can show contacts, other users, and/or other chat rooms in one window and a chain of instant messages in another window, although these features and the illustrated arrangement are not required. The User's previous digital messages can be seen along with digital messages from other users. The User has entered text that has been flagged as a potential violation of compliance policy or laws (for instance as determined by the compliance violation operation 104 in FIG. 1). The flagged text has also been highlighted. Although not illustrated, the ability for this digital message to be sent has been disabled.

In this embodiment, only a portion of the User's draft digital message has been identified as being a possible compliance violation, and thus only the flagged text has been highlighted. In some embodiments, the entire message may be editable, but not sendable, while in other embodiments, the User may only modify the flagged text while editing of the non-flagged text is disabled.

Figure 17:
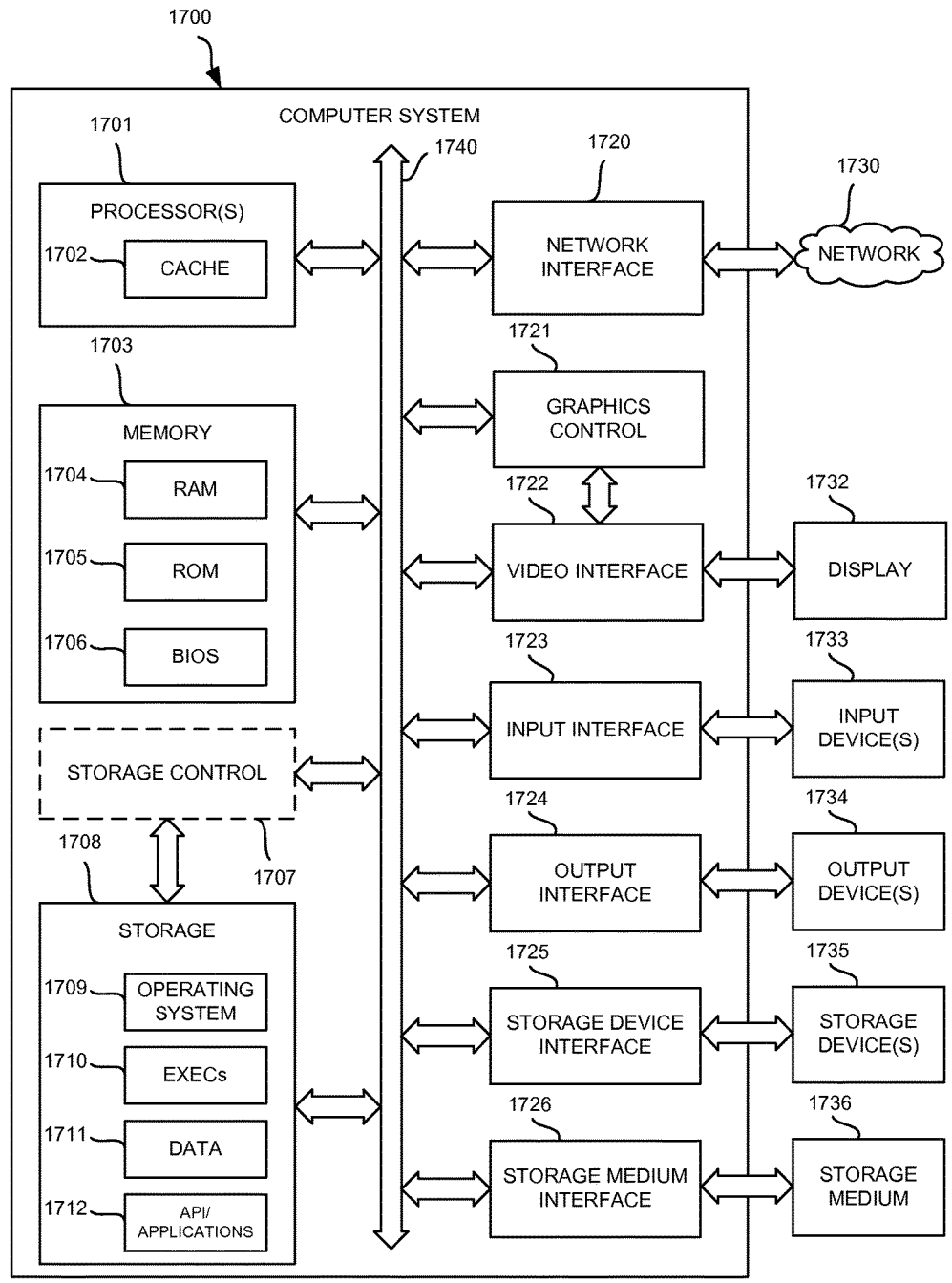
FIG. 17 shows a diagrammatic representation of one embodiment of a computer system.

The systems and methods described herein can be implemented in a computer system in addition to the specific physical devices described herein. FIG. 17 shows a diagrammatic representation of one embodiment of a computer system 1700 within which a set of instructions can execute for causing a device to perform or execute any one or more of the aspects and/or methodologies of the present disclosure. The computing device described as carrying out the method 100 in FIG. 1 is one implementation of the computer system 1700. The components in FIG. 17 are examples only and do not limit the scope of use or functionality of any hardware, software, firmware, embedded logic component, or a combination of two or more such components implementing particular embodiments of this disclosure. Some or all of the illustrated components can be part of the computer system 1700. For instance, the computer system 1700 can be a general purpose computer (e.g., a laptop computer) or an embedded logic device (e.g., an FPGA), to name just two non-limiting examples.

Computer system 1700 includes at least a processor 1701 such as a central processing unit (CPU) or an FPGA to name two non-limiting examples. A processor of the computing device that carries out the method 100 in FIG. 1 is one implementation of the processor 1701. The computer system 1700 may also comprise a memory 1703 and a storage 1708, both communicating with each other, and with other components, via a bus 1740. The bus 1740 may also link a display 1732, one or more input devices 1733 (which may, for example, include a keypad, a keyboard, a mouse, a stylus, etc.), one or more output devices 1734, one or more storage devices 1735, and various non-transitory, tangible computer-readable storage media 1736 with each other and with one or more of the processor 1701, the memory 1703, and the storage 1708. All of these elements may interface directly or via one or more interfaces or adaptors to the bus 1740. For instance, the various non-transitory, tangible computer-readable storage media 1736 can interface with the bus 1740 via storage medium interface 1726. Computer system 1700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1701 (or central processing unit(s) (CPU(s))) optionally contains a cache memory unit 1702 for temporary local storage of instructions, data, or computer addresses. Processor(s) 1701 are configured to assist in execution of computer-readable instructions stored on at least one non-transitory, tangible computer-readable storage medium. Computer system 1700 may provide functionality as a result of the processor(s) 1701 executing software embodied in one or more non-transitory, tangible computer-readable storage media, such as memory 1703, storage 1708, storage devices 1735, and/or storage medium 1736 (e.g., read only memory (ROM)). For instance, the method 100 in FIG. 1 may be embodied in one or more non-transitory, tangible computer-readable storage media. The non-transitory, tangible computer-readable storage media may store software that implements particular embodiments, such as the method 100, and processor(s) 1701 may execute the software. Memory 1703 may read the software from one or more other non-transitory, tangible computer-readable storage media (such as mass storage device(s) 1735, 1736) or from one or more other sources through a suitable interface, such as network interface 1720. A network interface of the computing device described relative to the method 100, where the network interface carries out at least part of the send digital message operation 106, is one embodiment of the network interface 1720. The software may cause processor(s) 1701 to carry out one or more processes or one or more steps of one or more processes described or illustrated herein. Carrying out such processes or steps may include defining data structures stored in memory 1703 and modifying the data structures as directed by the software. In some embodiments, an FPGA can store instructions for carrying out functionality as described in this disclosure (e.g., the method 100). In other embodiments, firmware includes instructions for carrying out functionality as described in this disclosure (e.g., the method 100).

The memory 1703 may include various components (e.g., non-transitory, tangible computer-readable storage media) including, but not limited to, a random access memory component (e.g., RAM 1704) (e.g., a static RAM "SRAM", a dynamic RAM "DRAM, etc.), a read-only component (e.g., ROM 1705), and any combinations thereof. ROM 1705 may act to communicate data and instructions unidirectionally to processor(s) 1701, and RAM 1704 may act to communicate data and instructions bidirectionally with processor(s) 1701. ROM 1705 and RAM 1704 may include any suitable non-transitory, tangible computer-readable storage media described below. In some instances, ROM 1705 and RAM 1704 include non-transitory, tangible computer-readable storage media for carrying out the method 100. In one example, a basic input/output system 1706 (BIOS), including basic routines that help to transfer information between elements within computer system 1700, such as during start-up, may be stored in the memory 1703.

Fixed storage 1708 is connected bidirectionally to processor(s) 1701, optionally through storage control unit 1707. Fixed storage 1708 provides additional data storage capacity and may also include any suitable non-transitory, tangible computer-readable media described herein. Storage 1708 may be used to store operating system 1709, EXECs 1710 (executables), data 1711, API applications 1712 (application programs), and the like. For instance, the storage 1708 could be implemented for storage of the database of text against which the compliance violation decision 104 and the correction violated 110 compare extracted text as described in FIG. 1. Often, although not always, storage 1708 is a secondary storage medium (such as a hard disk) that is slower than primary storage (e.g., memory 1703). Storage 1708 can also include an optical disk drive, a solid-state memory device (e.g., flash-based systems), or a combination of any of the above. Information in storage 1708 may, in appropriate cases, be incorporated as virtual memory in memory 1703.

In one example, storage device(s) 1735 may be removably interfaced with computer system 1700 (e.g., via an external port connector (not shown)) via a storage device interface 1725. Particularly, storage device(s) 1735 and an associated machine-readable medium may provide nonvolatile and/or volatile storage of machine-readable instructions, data structures, program modules, and/or other data for the computer system 1700. In one example, software may reside, completely or partially, within a machine-readable medium on storage device(s) 1735. In another example, software may reside, completely or partially, within processor(s) 1701.

Bus 1740 connects a wide variety of subsystems. Herein, reference to a bus may encompass one or more digital signal lines serving a common function, where appropriate. Bus 1740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1700 may also include an input device 1733. In one example, a user of computer system 1700 may enter commands and/or other information into computer system 1700 via input device(s) 1733. Examples of an input device(s) 1733 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1733 may be interfaced to bus 1740 via any of a variety of input interfaces 1723 (e.g., input interface 1723) including, but not limited to, serial, parallel, game port, USB, FIREWIRE, THUNDERBOLT, or any combination of the above.

In particular embodiments, when computer system 1700 is connected to network 1730 (such as a network over which the digital messages of FIG. 1 are transmitted), computer system 1700 may communicate with other devices, such as mobile devices and enterprise systems, connected to network 1730. Communications to and from computer system 1700 may be sent through network interface 1720. For example, network interface 1720 may receive incoming communications (such as requests or responses from other devices) in the form of one or more packets (such as Internet Protocol (IP) packets) from network 1730, and computer system 1700 may store the incoming communications in memory 1703 for processing. Computer system 1700 may similarly store outgoing communications (such as requests or responses to other devices) in the form of one or more packets in memory 1703 and communicated to network 1730 from network interface 1720. Processor(s) 1701 may access these communication packets stored in memory 1703 for processing.

Examples of the network interface 1720 include, but are not limited to, a network interface card, a modem, and any combination thereof. Examples of a network 1730 or network segment 1730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1730, may employ a wired and/or a wireless mode of communication. In general, any network topology may be used.

Information and data can be displayed through a display 1732. Examples of a display 1732 include, but are not limited to, a liquid crystal display (LCD), an organic liquid crystal display (OLED), a cathode ray tube (CRT), a plasma display, and any combinations thereof. The display 1732 can interface to the processor(s) 1701, memory 1703, and fixed storage 1708, as well as other devices, such as input device(s) 1733, via the bus 1740. The display 1732 is linked to the bus 1740 via a video interface 1722, and transport of data between the display 1732 and the bus 1740 can be controlled via the graphics control 1721.

In addition to a display 1732, computer system 1700 may include one or more other peripheral output devices 1734 including, but not limited to, an audio speaker, a printer, and any combinations thereof. Such peripheral output devices may be connected to the bus 1740 via an output interface 1724. Examples of an output interface 1724 include, but are not limited to, a serial port, a parallel connection, a USB port, a FIREWIRE port, a THUNDERBOLT port, and any combinations thereof.

In addition or as an alternative, computer system 1700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the method 100) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of precluding non-compliant ideas from being implemented as digital messages or documents, the method comprising:
   recording keystrokes on a first computing device, the keystrokes part of a digital message;
   parsing the keystrokes into words and symbols;
   assigning a score to each of the words;
   identifying a sequence of the words as an idea;
   calculating a first total of the scores assigned to the idea;
   comparing the first total of the scores to a first threshold, and if the first threshold is met or exceeded, then
   calculating a second total of scores assigned to the idea based on parts of speech and dependencies in the idea, where higher scores are assigned to the idea where a dependency is found between a verb and a direct object in the idea;
   determining that the second total of scores exceeds a second threshold; and in response,
   disabling further text entry into the digital message until the sequence has been changed or deleted from the digital message such that the second total of scores no longer exceeds the second threshold; and then
   allowing further text entry into the digital message.

2. The method of claim 1, wherein the second total of scores and the threshold are functions of subjective feedback from a plurality of compliance experts that review reports of blocked messages.

3. The method of claim 1, wherein higher scores are assigned to the idea when a first word in the idea depends from a second word in the idea and both the first and second words match words found in a phrase template.

4. The method of claim 1, wherein higher scores are assigned to the idea when the idea includes at least one verb and at least one object that match a phrase template comprising an array of verbs and objects.

5. The method of claim 1, further comprising identifying an end of the sequence via a user input that attempts to change the user interface window.

6. A method of precluding non-compliant ideas from being implemented as digital messages or documents, the method comprising:
   monitoring a digital message;
   determining if the digital message comprises a potential compliance violation, even where users attempt to obfuscate the intent of the digital messages, the determining comprising:
      assigning a score to each word in a sequence of words;
      calculating a first total of the scores assigned to a sequence of the words;
      comparing the first total of the scores to a first threshold, and if the first threshold is met or exceeded, then
      calculating a second total of scores assigned to the sequence based on parts of speech and dependencies in the sequence, and where higher scores are assigned to the sequence where a dependency is found between a verb and a direct object in the sequence;
      determining that the second total of scores exceeds a second threshold; and in response,
   disabling further text entry into the digital message until the sequence has been changed or deleted such that the second total of scores assigned to the sequence no longer exceeds the second threshold; and
   re-enabling further text entry once the second total of scores for the sequence no longer exceeds the second threshold.

7. The method of claim 6, wherein the digital message is selected from the group consisting of: a real-time text transmission message, a text message, an electronic mail message, a document that can be attached to an electronic message, and a fax message.

8. The method of claim 6, wherein the second total of scores and the second threshold are functions of subjective feedback from a plurality of compliance experts that review reports of blocked digital messages.

9. The method of claim 8, wherein higher scores are assigned to the sequence when it includes one or more groups of words, where at least one word in one of the groups is a verb and another is a noun.

10. The method of claim 8, wherein higher scores are assigned to the sequence when a first word in the sequence depends from a second word in the sequence and both the first and second word match words found in a phrase template.

11. The method of claim 6, wherein the disabling includes deleting a part or a whole of the sequence.

12. The method of claim 6, further comprising prompting a user to remove the sequence, and continuing to disable text entry until the user has removed the sequence.

13. A system for precluding non-compliant ideas from being implemented as digital messages or documents, the system comprising:

(a) a compliance engine stored on memory and executed on a processor comprising:

a scoring model used to distinguish compliant digital messages from non-compliant digital messages even where users attempt to obfuscate the intent of the digital messages;

feedback storage that receives and stores subjective feedback from a plurality of compliance experts;

a learning module configured to updating the scoring model based on the feedback in the feedback storage; and (b) a plurality of customer networks each comprising:

a plurality of customer devices each having a compliance client including a local copy of the scoring model of the compliance engine, each customer device monitors the creation of digital messages thereon and when a potential compliance violation is identified, disables further text entry until words forming potential compliance violations are removed or are altered to no longer be visible, wherein each customer device:

records keystrokes on a respective customer device, the keystrokes part of a digital message;

parses the keystrokes into words and symbols; assigns a score to each of the words;

calculates a first total of the scores assigned to a sequence of the words;

compares the first total of scores to a first threshold, and if the threshold is met or exceeded, then calculates a second total of scores assigned to the sequence based on parts of speech and dependencies in the sequence, and assigns higher scores to the sequence where a dependency is found between a verb and a direct object in the sequence;

determines that the second total of scores exceeds a second threshold; and in response, disables further text entry into the digital message until the sequence has been changed or deleted from the digital message such that the second total of scores no longer exceeds the threshold;

(c) a report storage storing data describing messages that were modified by the compliance clients;

(d) a customer input/output coupled to the report storage and configured to present the data describing digital messages that were modified to a compliance expert and further configured to receive feedback from the compliance expert regarding a subjective analysis of the appropriateness of modifying of the digital messages; and (e) a feedback storage coupled to the customer input/output and comprising the feedback from the compliance expert.

* * * * *